(12) United States Patent
Xiao et al.

(10) Patent No.: US 11,626,591 B2
(45) Date of Patent: Apr. 11, 2023

(54) SILICON-CONTAINING ELECTROCHEMICAL CELLS AND METHODS OF MAKING THE SAME

(71) Applicant: GM GLOBAL TECHNOLOGY OPERATIONS LLC, Detroit, MI (US)

(72) Inventors: Xingcheng Xiao, Troy, MI (US); Mark W. Verbrugge, Troy, MI (US); Xingyi Yang, Sterling Heights, MI (US); Lei Wang, Rochester Hills, MI (US); Raghunathan K, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 244 days.

(21) Appl. No.: 17/039,366

(22) Filed: Sep. 30, 2020

(65) Prior Publication Data

US 2022/0102725 A1   Mar. 31, 2022

(51) Int. Cl.
| | |
|---|---|
| *H01M 4/00* | (2006.01) |
| *H01M 4/58* | (2010.01) |
| *H01M 10/0525* | (2010.01) |
| *H01M 4/136* | (2010.01) |
| *H01M 4/505* | (2010.01) |
| *H01M 4/525* | (2010.01) |
| *H01M 4/1397* | (2010.01) |
| *H01M 4/133* | (2010.01) |
| *H01M 4/62* | (2006.01) |

(Continued)

(52) U.S. Cl.
CPC ........ *H01M 4/5825* (2013.01); *H01M 4/133* (2013.01); *H01M 4/136* (2013.01); *H01M 4/1393* (2013.01); *H01M 4/1397* (2013.01); *H01M 4/505* (2013.01); *H01M 4/525* (2013.01); *H01M 4/622* (2013.01); *H01M 10/0525* (2013.01); *H01M 2004/027* (2013.01); *H01M 2004/028* (2013.01)

(58) Field of Classification Search
CPC .... H01M 4/1397; H01M 4/622; H01M 4/133; H01M 2004/028; H01M 2004/027
See application file for complete search history.

(56) References Cited

U.S. PATENT DOCUMENTS

| | | | |
|---|---|---|---|
| 8,440,350 | B1 | 5/2013 | Verbrugge et al. |
| 8,859,144 | B2 | 10/2014 | Xiao |

(Continued)

FOREIGN PATENT DOCUMENTS

| | | |
|---|---|---|
| CN | 114335493 A | 4/2022 |
| DE | 102021111231 A1 | 3/2022 |

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

An electrochemical cell is provided herein as well as methods for preparing electrochemical cells. The electrochemical cell includes a negative electrode and a positive electrode. The negative electrode includes a prelithiated electroactive material including a lithium silicide. Lithium is present in the prelithiated electroactive material in an amount corresponding to greater than or equal to about 10% of a state of charge of the negative electrode. The electrochemical cell has a negative electrode capacity to positive electrode capacity for lithium (N/P) ratio of greater than or equal to about 1, and the electrochemical cell is capable of operating at an operating voltage of less than or equal to about 5 volts.

20 Claims, 10 Drawing Sheets

(51) Int. Cl.
*H01M 4/1393* (2010.01)
*H01M 4/02* (2006.01)

(56) References Cited

U.S. PATENT DOCUMENTS

| | | |
|---|---|---|
| 8,999,584 B2 | 4/2015 | Jiang et al. |
| 9,005,811 B2 | 4/2015 | Xiao et al. |
| 9,093,705 B2 | 7/2015 | Xiao et al. |
| 9,142,830 B2 | 9/2015 | Xiao et al. |
| 9,302,914 B2 | 4/2016 | Liu et al. |
| 9,362,551 B2 | 6/2016 | Sachdev et al. |
| 9,379,374 B2 | 6/2016 | Liu et al. |
| 9,531,004 B2 | 12/2016 | Xiao et al. |
| 9,564,639 B2 | 2/2017 | Huang |
| 9,570,752 B2 | 2/2017 | Huang et al. |
| 9,577,251 B2 | 2/2017 | Xiao et al. |
| 9,780,361 B2 | 10/2017 | Xiao et al. |
| 10,062,898 B2 | 8/2018 | Xiao |
| 10,141,569 B2 | 11/2018 | Verbrugge et al. |
| 10,164,245 B2 | 12/2018 | Huang |
| 10,593,988 B2 | 3/2020 | Xiao et al. |
| 2018/0205114 A1 | 7/2018 | Pauric et al. |
| 2019/0165418 A1* | 5/2019 | Petricci ............ H01M 10/0567 |
| 2020/0020948 A1 | 1/2020 | Huang et al. |
| 2020/0020949 A1 | 1/2020 | Huang |
| 2020/0119339 A1 | 4/2020 | Halalay et al. |
| 2020/0127292 A1 | 4/2020 | Halalay et al. |
| 2020/0220153 A1 | 7/2020 | Xiao et al. |
| 2020/0220154 A1 | 7/2020 | Xiao et al. |

* cited by examiner

SILICON-CONTAINING ELECTROCHEMICAL CELLS AND METHODS OF MAKING THE SAME

FIELD

The present disclosure relates to electrochemical cells including prelithiated silicon-containing negative electrodes, which can operate at a lower voltage window and methods for making electrochemical cells.

BACKGROUND

This section provides background information related to the present disclosure which is not necessarily prior art.

High-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a cathode), a second electrode of opposite polarity (e.g., an anode), an electrolyte material, and a separator. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. For convenience, a negative electrode will be used synonymously with an anode, although as recognized by those of skill in the art, during certain phases of lithium ion cycling the anode function may be associated with the positive electrode rather than negative electrode (e.g., the negative electrode may be an anode on discharge and a cathode on charge).

In various aspects, an electrode includes an electroactive material. Negative electrodes typically comprise such an electroactive material that is capable of functioning as a lithium host material serving as a negative terminal of a lithium ion battery. Conventional negative electrodes include the electroactive lithium host material and optionally another electrically conductive material, such as carbon black particles, as well as one or more polymeric binder materials to hold the lithium host material and electrically conductive particles together.

Typical electroactive materials for forming a negative electrode (e.g., an anode) in a lithium ion electrochemical cell include lithium-graphite intercalation compounds, lithium-silicon alloys, lithium-tin compounds, and other lithium alloys. While graphite compounds are most common, recently, anode materials with high specific capacity (in comparison with conventional graphite) are of growing interest. For example, silicon has one of the highest known theoretical capacities for lithium, making it one of the most attractive alternatives to graphite as a negative electrode material for rechargeable lithium ion batteries. However, current silicon anode materials suffer from significant drawbacks. For example, silicon-containing materials experience large volume changes (e.g., volume expansion/contraction) during lithium insertion/extraction (e.g., intercalation and deintercalation). Moreover, the initial lithiation process of silicon-based electroactive materials can promote an increase in surface roughness. Further, additional volumetric changes may occur during successive charging and discharging cycles for silicon electroactive materials. Such volumetric changes can lead to fatigue cracking and decrepitation of the electroactive material. This may potentially lead to a loss of electrical contact between the silicon-containing electroactive material and the rest of the battery cell as well as the consumption of electrolyte to form new solid electrolyte interface (SEI), resulting in a decline of electrochemical cyclic performance, diminished Coulombic charge capacity retention (capacity fade), and limited cycle life.

Additionally, current silicon electrode materials as well as other high specific capacity materials can suffer from first cycle active lithium losses from the positive electrode, for example, caused by formation of a solid electrolyte interphase (SEI) layer at the negative electrode, which limits battery performance. High specific capacity materials can also suffer from additional ongoing active lithium loss due to continuous SEI breakage and re-formation caused by the aforementioned large volume changes. This loss of active lithium can permanently decrease the available energy of the battery.

It would be desirable to develop high performance electrode materials, particularly comprising silicon, and methods for preparing such high performance electrodes materials for use in high energy and high power lithium ion batteries, which overcome the current shortcomings that prevent their widespread commercial use, especially in vehicle applications. Accordingly, it would be desirable to develop methods of making electroactive materials comprising silicon or other electroactive materials that undergo significant volumetric changes during lithium ion cycling that are capable of minimal capacity fade and maximized charge capacity in commercial lithium ion batteries with long lifespans, especially for transportation applications. For long term and effective use, high specific capacity electrode materials, such as silicon, should be capable of minimal capacity fade and maximized charge capacity for long-term use in lithium ion batteries.

SUMMARY

This section provides a general summary of the disclosure and is not a comprehensive disclosure of its full scope or all of its features.

In certain aspects, the present disclosure provides an electrochemical cell. The electrochemical cell includes a negative electrode including a first electroactive material including a lithium silicide and a positive electrode including a second electroactive material. Lithium is present in the prelithiated electroactive material in an amount corresponding to greater than or equal to about 10% of a state of charge of the negative electrode. The electrochemical cell has a negative electrode capacity to positive electrode capacity for lithium (N/P) ratio of greater than or equal to about 1, and the electrochemical cell is capable of operating at an operating voltage of less than or equal to about 5 volts.

The second electroactive material is selected from the group consisting of: $Li_{(1+x)}Mn_2O_4$, where $0.1 \le x \le 1$; $LiMn_{(2-x)}Ni_xO_4$, where $0 \le x \le 0.5$; $LiCoO_2$; $Li(Ni_xMn_yCo_z)O_2$, where $0 \le x \le 1$, $0 \le y \le 1$, $0 \le z \le 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \le x \le 1$, $0 \le y \le 1$, $0 \le z \le 1$, $0 \le P \le 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), sulfur, selenium, and a combination thereof.

The operating voltage is as low as about 2 volts, and the operating voltage is about 2 volts to about 4.5 volts.

The N/P ratio is about 1.3 to about 3.

The lithium silicide is lithium silicide particles and the lithium is present in the prelithiated electroactive material in an amount corresponding to greater than or equal to about 10% to about 70% of the state of charge of the negative electrode.

The electrochemical cell is capable of operating at the operating voltage: (i) during at least a first cycle; (ii) when discharge capacity of the electrochemical cell is less than or equal to 90%; or a combination of (i) and (ii).

The electrochemical cell is in a state prior to operation.

In yet other aspects, the present disclosure provides a method of preparing an electrochemical cell. The method includes forming a silicon-containing negative electrode including prelithiating a silicon-containing electroactive material with an amount of lithium to form a prelithiated electroactive material including a lithium silicide. The amount of lithium is determined based on the following determined parameters of the electrochemical cell: (i) a positive electrode areal capacity; (ii) a negative electrode capacity to a positive electrode capacity for lithium (N/P) ratio of the electrochemical cell; (iii) a first cycle capacity loss of the electrochemical cell; and (iv) a state of charge of the silicon-containing negative electrode. The positive electrode capacity is greater than or equal to about 1 mAh/cm². The N/P ratio is greater than or equal to about 1. The first cycle capacity loss is greater than or equal to about 10%, and the state of charge of silicon-containing negative is greater than or equal to 10%.

The positive electrode capacity is about 1 mAh/cm² to about 8 mAh/cm². The N/P ratio is about 1 to 3. The first cycle capacity loss is about 10% to about 50%, and the state of charge of the silicon-containing negative electrode is about 10% to about 70%.

The amount of lithium is determined according to equation (i):

$$C_{pre-Li} = C_p(R_{n/p} \times E_{fc} + X\% \times R_{n/p} - 1) \quad \text{(i)}$$

wherein: $C_{pre-Li}$ is a capacity corresponding to the amount of lithium; $C_p$ is the positive electrode areal capacity; $R_{n/p}$ is the N/P ratio; $E_{fc}$ is the first cycle capacity loss; and X % is the state of charge of the silicon-containing negative electrode.

The method further includes admixing an electrically conductive material with the prelithiated electroactive material, wherein the electrically conductive material is selected from the group consisting of carbon black, graphite, carbon nanotubes, carbon fibers, nitrogen-doped carbon, graphene, graphene nanoplatelet, and combinations thereof.

The method further includes admixing a solvent with a polymeric binder and the prelithiated electroactive material to form a mixture, and applying the mixture to a current collector and volatilizing the solvent at a suitable temperature to form the silicon-containing negative electrode. The solvent is selected from the group consisting of: N-methyl-2-pyrrolidone (NMP), dimethylformamide (DMF), dimethyl sulfoxide, propylene carbonate, acetonitrile, tetrahydrofuran, and combinations thereof.

The method further includes forming a positive electrode comprising a second electroactive material, wherein the second electroactive material is selected from the group consisting of: $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), sulfur, selenium, and a combination thereof.

The electrochemical cell is capable of operating at an operating voltage of about 2 volts to about 4.5 volts: (i) during at least a first cycle; (ii) when discharge capacity of the electrochemical cell is less than or equal to 90%; or a combination of (i) and (ii).

In yet other aspects, the present disclosure provides another method of preparing an electrochemical cell. The method include (a) determining an amount of lithium to prelithiate a silicon-containing electroactive material for forming a silicon-containing negative electrode and determining a negative electrode capacity to a positive electrode capacity for lithium (N/P) ratio of the electrochemical cell. Determining the amount of lithium and determining the N/P ratio are based on the following parameters: (i) a determined minimum fractional lithium occupancy, (ii) a determined maximum fractional lithium occupancy, (iii) a determined first cycle efficiency of the silicon-containing negative electrode, and (iv) a determined first cycle efficiency of the positive electrode. The method further includes (b) prelithiating the silicon-containing electroactive material with the amount of lithium determined in step (a) to form a prelithiated electroactive material comprising a lithium silicide.

The NP ratio is determined according to equation (vii):

$$NP = \frac{1}{z_{max} - z_{min}}; \quad \text{(vii)}$$

and the pre-lithiation loading is determined according to equation (viii):

$$\phi = z_{max} - \frac{Z}{NP} \quad \text{(viii)}$$

wherein: $\Phi$ is the pre-lithiation loading, defined as the percentage of the amount of lithium for prelithiation to the reversible capacity of the negative electrode; NP is the N/P ratio; $z_{max}$ is the maximum fractional lithium occupancy for the designated operating window of the negative electrode; $z_{min}$ is the minimum fractional lithium occupancy for the designated operating window of the negative electrode; and $Z = 1/\eta_p - NP(1/\eta_n - 1)$, wherein $\eta_n$ is the first cycle efficiency of the silicon-containing negative electrode and $\eta_p$ is the first cycle efficiency of the positive electrode.

The method further includes comprising admixing an electrically conductive material with the prelithiated electroactive material. The electrically conductive material is selected from the group consisting of carbon black, graphite, carbon nanotubes, carbon fibers, nitrogen-doped carbon, graphene, graphene nanoplatelet, and combinations thereof.

The method further includes admixing a solvent with a polymeric binder and the prelithiated electroactive material to form a mixture and applying the mixture to a current collector and volatilizing the solvent to form the silicon-containing negative electrode. The solvent is selected from the group consisting of: N-methyl-2-pyrrolidone (NMP), dimethylformamide (DMF), dimethyl sulfoxide, propylene carbonate, acetonitrile, tetrahydrofuran, and combinations thereof.

The method further includes forming a positive electrode comprising a second electroactive material, wherein the second electroactive material is selected from the group consisting of: $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0 < x < 0.2$, $y < 0.2$, and M is Al, Mg, or Ti; $LiFePO_4$, $LiMn_{2-x}Fe_xPO_4$, where $0 < x < 0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), sulfur, selenium, and a combination thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
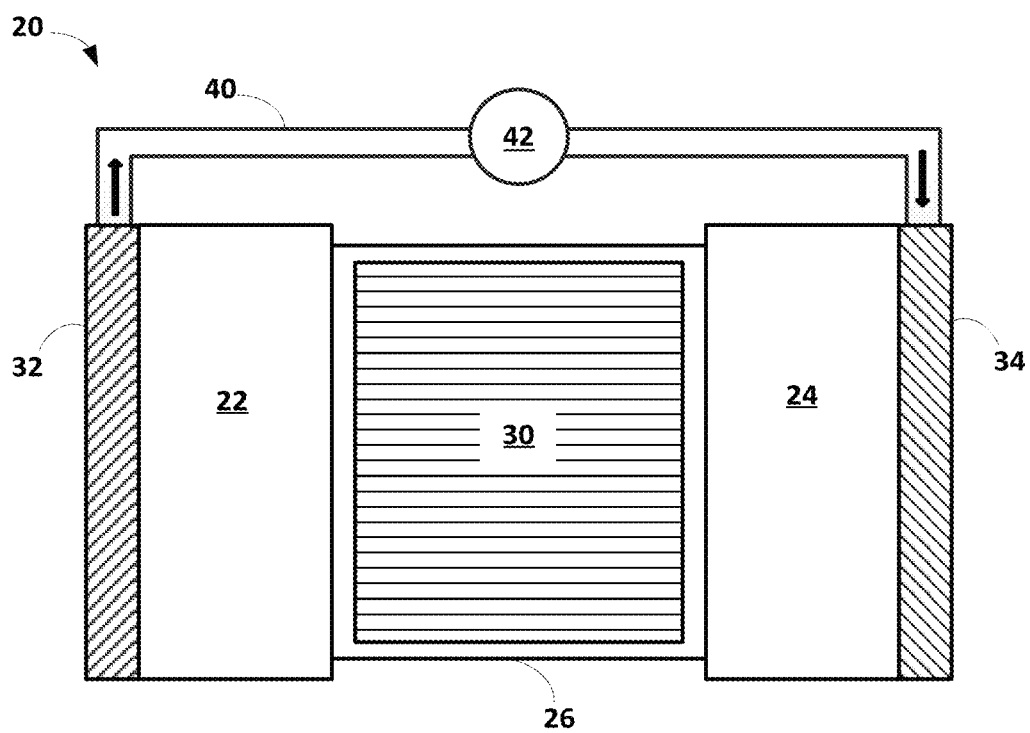
FIG. 1 is a schematic of an exemplary electrochemical battery cell.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," "attached to," or "coupled to" another element or layer, it may be directly on, engaged, connected, attached or coupled to the other component, element, or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure pertains to high-performance lithium ion electrochemical cells (e.g., lithium ion batteries) having improved electrodes and methods of making the same. In lithium ion electrochemical cells or batteries, a negative electrode typically includes a lithium insertion material or an alloy host material. As discussed above, conventional electroactive materials for forming a negative electrode or anode include lithium-graphite intercalation compounds, lithium-silicon alloys, lithium-tin compounds, and other lithium alloys. While graphite compounds are most commonly used, certain anode materials with high specific capacity (in comparison with conventional graphite) are of growing interest. Silicon (Si), silicon oxide, and tin are attractive alternatives to graphite as an anode material for rechargeable lithium ion batteries due to their high theoretical capacity. However, large capacity negative electrodes can suffer from a large irreversible capacity loss during the first cycle (i.e., "formation process") due to a permanent loss of lithium ions from the positive electrode, for example, due to the formation of an SEI layer on the negative electrode during the first cycle as well as ongoing lithium loss due to continuous SEI breakage. This permanent loss of lithium ions can result in a decreased specific energy and power in the battery due to the added positive electrode mass that does not participate in the reversible operation of the battery. Additionally, silicon-containing materials can experience large volume changes (e.g., volume expansion/contraction) during lithium insertion/extraction (e.g., intercalation and deintercalation), which can lead to fatigue cracking and decrepitation of the electroactive material. These challenges have been a barrier to their widespread use in lithium ion batteries. Thus, methods of prelithiating electrodes, i.e., adding lithium to the active lithium content prior to battery operation, as well as pre-lithiated electrodes are needed to compensate for the loss of lithium ions, to decrease battery cost, and to maximize specific power and energy.

The present disclosure provides improved electrodes and methods of making improved electrodes for an electrochemical cell, which can address the above-described challenges. For example, an exemplary and schematic illustration of an electrochemical cell (also referred to as the lithium ion battery or battery) 20 is shown in FIG. 1. Lithium ion battery 20 includes a negative electrode 22, a positive electrode 24, and a separator 26 (e.g., a microporous polymeric separator) disposed between the two electrodes 22, 24. The space between (e.g., the separator 26) the negative electrode 22 and positive electrode 24 can be filled with the electrolyte 30. If there are pores inside the negative electrode 22 and positive electrode 24, the pores may also be filled with the electrolyte 30. In alternative embodiments, a separator 26 is not included if a solid electrolyte is used. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40.

An interruptible external circuit 40 and load device 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the lithium ion battery 20. The separator 26 also contains the electrolyte solution in a network of open pores during the cycling of lithium ions, to facilitate functioning of the battery 20.

The lithium ion battery 20 can generate an electric current during discharge by way of reversible electrochemical reactions that occur when the external circuit 40 is closed (to connect the negative electrode 22 and the positive electrode 24) when the negative electrode 22 contains a relatively greater quantity of inserted lithium. The chemical potential difference between the positive electrode 24 and the negative electrode 22 drives electrons produced by the oxidation of inserted lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 40 can be harnessed and directed through the load device 42 until the inserted lithium in the negative electrode 22 is depleted and the capacity of the lithium ion battery 20 is diminished.

The lithium ion battery 20 can be charged or re-powered/re-energized at any time by connecting an external power source to the lithium ion battery 20 to reverse the electrochemical reactions that occur during battery discharge. The connection of an external power source to the lithium ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with inserted lithium for consumption during the next battery discharge event. As such, a complete discharging event followed by a complete charging event is considered to be a cycle, where lithium ions are cycled between the positive electrode 24 and the negative electrode 22. The external power source that may be used to charge the lithium ion battery 20 may vary depending on the size, construction, and particular end-use of the lithium ion battery 20. Some notable and exemplary external power sources include, but are not limited to, an AC wall outlet and a motor vehicle alternator.

In many lithium ion battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package. The negative electrode current collector 32 and positive electrode current collector 34 respectively collect and move free electrons to and from an external circuit 40.

Furthermore, the lithium ion battery 20 can include a variety of other components that while not depicted here are nonetheless known to those of skill in the art. For instance, the lithium ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. The battery 20 shown in FIG. 1 includes a liquid electrolyte 30 and shows representative concepts of battery operation. However, the battery 20 may also be a solid-state battery that includes a solid-state electrolyte that may have a different design, as known to those of skill in the art.

As noted above, the size and shape of the lithium ion battery 20 may vary depending on the particular application for which it is designed. Battery-powered vehicles and hand-held consumer electronic devices, for example, are two examples where the lithium ion battery 20 would most likely be designed to different size, capacity, and power-output specifications. The lithium ion battery 20 may also be connected in series or parallel with other similar lithium ion cells or batteries to produce a greater voltage output and power density if it is required by the load device 42.

Accordingly, the lithium ion battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the lithium ion battery 20 for purposes of storing energy.

The present technology pertains to improved electrochemical cells, especially lithium-ion batteries. In various instances, such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-di ethoxy ethane, ethoxymethoxymethane), cyclic ethers (e.g., tetrahydrofuran, 2-methyltetrahydrofuran), 1,3-dioxolane), sulfur compounds (e.g., sulfolane), and combinations thereof.

The separator 26 may comprise, for example, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

In various aspects, the porous separator 26 and the electrolyte 30 in FIG. 1 may be replaced with a solid-state electrolyte (SSE) (not shown) that functions as both an electrolyte and a separator. The SSE may be disposed between the positive electrode 24 and negative electrode 22. The SSE facilitates transfer of lithium ions, while mechanically separating and providing electrical insulation between the negative and positive electrodes 22, 24. By way of non-limiting example, SSEs may include $LiTi_2(PO_4)_3$, $LiGe_2(PO_4)_3$, $Li_7La_3Zr_2O_{12}$, $Li_3xLa_{2/3-x}TiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof.

The positive electrode 24 may be formed from a lithium-based active material that can sufficiently undergo lithium intercalation and deintercalation while functioning as the positive terminal of the lithium ion battery 20. The positive electrode 24 may also include a polymeric binder material to structurally fortify the lithium-based active material and an electrically conductive material. One exemplary common class of known materials that can be used to form the positive electrode 24 is layered lithium transitional metal oxides. For example, in certain embodiments, the positive electrode 24 may comprise at least one spinel, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); $LiMn_2O_4$ (LMO); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O_2$); $LiNiMnCoO_2$; or a lithium nickel cobalt metal oxide ($LiNi_{(1-x-y)}Co_xM_yO_2$, where $0<x<0.2$, $y<0.2$, and M may be Al, Mg, Ti, or the like); $LiNiCoAlO_2$; or a lithium iron polyanion oxide with olivine structure, such as lithium iron phosphate ($LiFePO_4$), lithium manganese-iron phosphate ($LiMn_{2-x}Fe_xPO_4$, where $0<x<0.3$), lithium iron fluorophosphate ($Li_2FePO_4F$); $LiMPO_4$, where M is at least one of Fe, Ni, Co, and Mn; or $LiFeSiO_4$; activated carbon, and combinations thereof.

In certain variations, the positive electroactive materials may be intermingled with an electronically conducting material that provides an electron conduction path and/or at least one polymeric binder material that improves the structural integrity of the electrode. For example, the electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like, hi certain aspects, mixtures of the conductive materials may be used. The positive electrode current collector 34 may be formed from aluminum (Al) or any other appropriate electrically conductive material known to those of skill in the art. The positive current collector 34 may be formed from aluminum or any other appropriate electrically conductive material known to those of skill in the art.

In various aspects, the negative electrode 22 includes an electroactive material as a lithium host material capable of functioning as a negative terminal of a lithium ion battery. The negative electrode current collector 32 may comprise a metal comprising copper, nickel, or alloys thereof or other appropriate electrically conductive materials known to those of skill in the art. In certain aspects, the positive electrode current collector 34 and/or negative electrode current collector 32 may be in the form of a foil, slit mesh, and/or woven mesh. The negative electrode 22 can include a lithium host or negative electroactive materials and optionally, another electrically conductive material (also referred to as "electrically conductive filler material"), as well as one or more polymeric binder materials to structurally hold the lithium host material together. Such negative electroactive materials may be intermingled with the electrically conductive material and at least one polymeric binder. The polymeric binder can create a matrix retaining the negative electroactive materials and electrically conductive material in position within the electrode. Polymeric binder can fulfill multiple roles in an electrode, including: (i) enabling the electronic and ionic conductivities of the composite electrode, (ii) providing the electrode integrity, e.g., the integrity of the electrode and its components, as well as its adhesion with the current collector, and (iii) participating in the formation of solid electrolyte interphase (SEI), which plays an important role as the kinetics of lithium intercalation is predominantly determined by the SEI.

As discussed above, certain negative electroactive materials suffer from significant volumetric expansion during lithium cycling (e.g., capable of accepting the insertion of lithium ions during charging of the electrochemical cell via lithiation or "intercalation" and releasing lithium ions during discharging of the electrochemical cell via delithiation or "deintercalation" or lithium alloying/dealloying). In certain aspects, the present disclosure provides an electrochemical cell (e.g., electrochemical cell 20) including a silicon-containing negative electrode (e.g., negative electrode 22) and a positive electrode (e.g., positive electrode 24). It is contemplated herein that the electrochemical cell described herein is in a state prior to operation including prior to any cycling (charge and/or discharge cycle), and prior to a formation process. The electrochemical cell described herein has a combination of features that can be controlled so as to advantageously minimize stress in the silicon-containing negative electrode caused by lithium ion diffusion and also result in synergistic effects of improved cycle stability as well as increased energy density due to an expanded potential window. In various aspects, this combination of features for the electrochemical cell includes: (i) an amount of lithium present in the prelithiated electroactive material; (ii) a negative electrode capacity to positive electrode capacity for lithium (N/P) ratio; and (iii) operating the electrochemical cell at a lower operating voltage window. Thus, in any embodiment, an electrochemical cell (e.g., electrochemical cell 20) is disclosed herein including a negative electrode (e.g., negative electrode 22) comprising a first prelithiated electroactive material comprising a lithium silicide (also referred to as lithiated silicon) and a positive electrode (e.g., positive electrode 24), wherein the electrochemical cell includes a combination of the following: (i) a designated amount of lithium present in the prelithiated electroactive material; (ii) a designated negative electrode capacity to positive electrode capacity for lithium (N/P) ratio; and (iii) wherein the electrochemical cell is capable of operating or is configured to operate at a lower operating voltage window.

The lithium silicide ($Li_xSi$) present in the negative electrode can be formed by prelithiating silicon-containing electroactive material to form the prelithiated electroactive material. The lithium silicide may be in particle form, i.e., lithium silicide particles. The prelithiated electroactive material may then be used to prepare a negative electrode with lithium incorporated therein. Non-limiting examples of silicon-containing electroactive materials include silicon, or silicon containing binary and ternary alloys, such as Si—Sn, SiSnFe, SiSnAl, SiFeCo, and the like. The electroactive material may be in particle form. The negative electrode may include silicon-containing electroactive material and/or a lithium silicide in amount from about 5 wt % to about 98 wt % based on total wt % of the negative electrode. In any embodiment, the lithium silicide present in the negative electrode can correspond to $Li_xSi$, where $0<x<3.75$, $0<x<3$, or $0.5<x<2.5$.

A suitable or designated amount of lithium present in the prelithiated electroactive material can correspond to a state of charge of the negative electrode. State of charge of the negative electrode is the amount of charge stored in the negative electrode (e.g., negative electrode 22) at a given time or the amount of charge capacity that is presently utilized. Negative electrode state of charge may be expressed in terms of percentage of the of the negative electrode charge capacity. When the negative electrode is charged to its capacity the state of charge may be 100%. For example, an amount of lithium present in the prelithiated electroactive material or the negative electrode can correspond to greater than or equal to about 10% of a state of charge of the negative electrode, greater than or equal to about 20% of a state of charge of the negative electrode, greater than or equal to about 30% of a state of charge of the negative electrode, greater than or equal to about 40% of a state of charge of the negative electrode, greater than or equal to about 50% of a state of charge of the negative electrode, greater than or equal to about 60% of a state of charge of the negative electrode, or about 70% of a state of charge of the negative electrode; or from about 10% to about 70% of a state of charge of the negative electrode, about 10% to about 50% of a state of charge of the negative electrode, or about 20% to about 40% of a state of charge of the negative electrode. A person of ordinary skill in the art understands how a state of charge of a negative electrode corresponds to an amount of lithium present in the negative electrode. For example, state of charge can be understood as the ratio of lithium amount (e.g., mAh/cm$^2$) to areal capacity of negative electrode (e.g., in mAh/cm$^2$). For example, if a silicon-containing negative electrode has an areal capacity of 9 mAh/cm$^2$ and the desired amount of lithium to prelithiate silicon-containing electroactive material is 50% of a state of charge of the silicon-containing negative electrode, the amount of lithium needed for prelithiation corresponds to 4.5 mAh/cm$^2$ (i.e., 0.50×9 mAh/cm$^2$).

Additionally, the electrochemical cell has a negative electrode capacity for lithium to positive electrode capacity for lithium (N/P) ratio of greater than or equal to about 1, greater than or equal to about 1.1, greater than or equal to about 1.3, greater than or equal to about 1.5, greater than or equal to about 1.7, greater than or equal to about 1.9, greater than or equal to about 2.2, greater than or equal to about 2.4 or greater than or equal to about 2.6, greater than or equal to about 2.8, or about 3; or from about 1 to about 3, about 1 to about 2.6, about 1.1 to about 2.6, about 1.1 to about 2.4, about 1.3 to about 3, about 1.3 to about 2.8, about 1.3 to about 2.2, about 1.5 to about 2.2, or about 1.7 to about 2.2. A person of ordinary skill in the art understands how to calculate the N/P ratio based upon the materials selected for the negative electrode and the positive electrode. Unless stated otherwise, the "N/P ratio" described herein refers to the ratio of the areal capacity of the negative electrode to the areal capacity of the positive electrode.

In any embodiment, the electrochemical cell is capable of operating or is configured to operate in a lower voltage window. For example, the electrochemical cell is capable of operating at an operating voltage as low as about 1.7 volts, as low as about 2 volts, as low as about 2.2 volts, as low as about 2.5 volts, as low as about 2.7 volts, as low as about 3 volts, as low as about 3.2 volts, as low as about 3.5 volts, as low as about 3.7 volts, as low as about 4 volts, as low as about 4.2 volts, as low as about 4.5 volts or about 4.7 volts. In other words, the electrochemical cell is capable of operating within an operating voltage range having a lower limit or minimum of about 1.7 volts, about 2 volts, about 2.2 volts, about 2.5 volts, about 2.7 volts, about 3 volts, about 3.2, about 3.5 volts, about 3.7 volts, about 4 volts, about 4.2 volts, or about 4.5 volts. Additionally or alternatively, the electrochemical cell is capable of operating at an operating voltage at a maximum or at an upper limit of less than or equal to about 2 volts, less than or equal to about 2.2 volts, less than or equal to about 2.5 volts, less than or equal to about 2.7 volts, less than or equal to about 3 volts, less than or equal to about 3.2 volts, less than or equal to about 3.5 volts, less than or equal to about 3.7 volts, less than or equal to about 4 volts, less than or equal to about 4.2 volts, less than or equal to about 4.5 volts, less than or equal to about 4.7 volts or less than or equal to about 5 volts, hi any embodiment, the electrochemical cell is capable of operating at an operating voltage from about 1.7 volts to about 5 volts, about 1.7 volts to about 4.7 volts, about 1.7 volts to about 4.7 volts, about 1.7 volts to about 4.7 volts, about 1.7 volts to about 4.7 volts, about 1.7 volts to about 4.7 volts, about 1.7 volts to about 4.7 volts, about 2 volts to about 4.5 volts, about 2.2 volts to about 4.2 volts, about 2.5 volts to about 4.2 volts, or about 2.5 volts to about 4 volts.

In any embodiment, the second electroactive material present in the positive electrode can be selected from the group consisting of: $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur (e.g., greater than 60 wt % based on total weight of the positive electrode), and combinations thereof. In any embodiment, the second electroactive material may be NMC622, NCMA, LMO, LiFeMnPO$_4$, or a combination thereof.

For silicon-containing negative electrodes, for example, at the initial cycling stage, volume expansion and contraction typically results in electroactive particle pulverization of lithiated silicon ($Li_xSi$) wherein lithiated silicon particles separate or fracture from the electroactive material to form lithiated silicon particle fragments. These lithiated silicon particle fragments become covered by a SEI layer effectively resulting in a loss of electroactive material and trapping lithium such that it cannot be released during charging and discharging, and the electrochemical cell experiences capacity fade, limited cycle life, and lower energy density. In order to address these challenges, an electrochemical cell as described herein may have any combination of the above-described features of: (i) amount of lithium present in the prelithiated electroactive material, (ii) N/P ratio, and (iii) operating voltage. For example, the electrochemical cell may have: (i) an amount of lithium present in the prelithiated electroactive material corresponding to greater than or equal to about 10% of a state of charge of the negative electrode, for example, about 10% to about 70% or about 20% to about 40% of a state of charge of the negative electrode; (ii) an N/P ratio of greater than or equal to about 1, for example, about 1.3 to about 2.2 or about 1.7 to about 2.2; and (iii) the electrochemical cell may be capable of operating at an operating voltage as low as about 2 volts or less than or equal to about 5 volts, for example, about 2 volts to about 4.5 volts or about 2.5 volts to about 4.2 volts.

Figure 2:
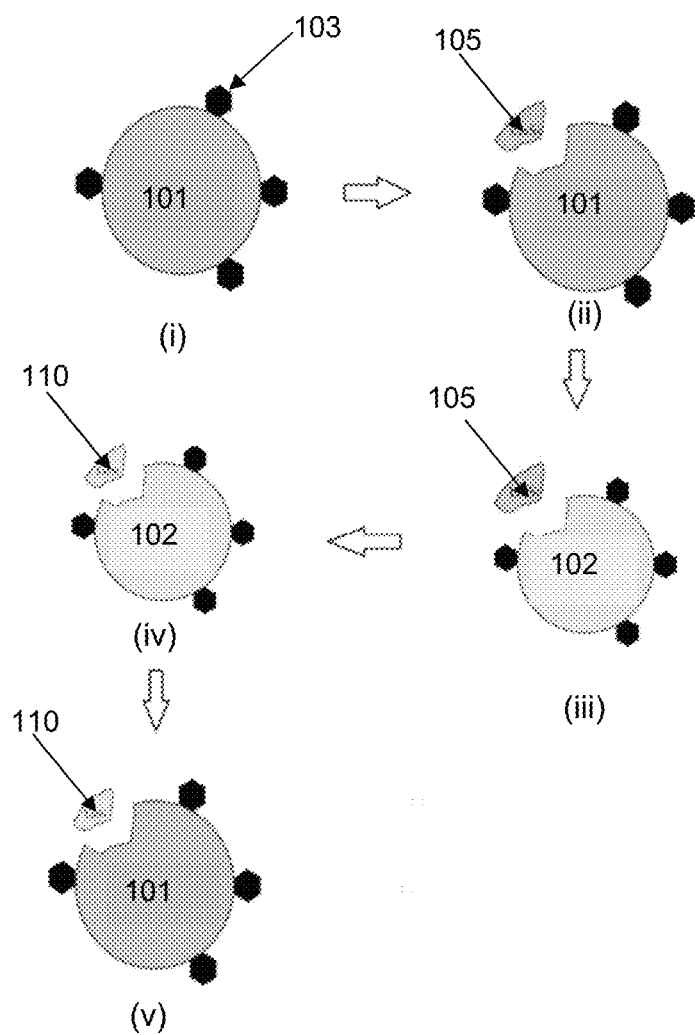
FIG. 2 is a schematic of loss of lithium from the lithium silicide electroactive material and release of lithium back to the lithium silicide electroactive material by operating an electrochemical cell at a lower voltage window.

Advantageously, the combination of features described herein can overcome an energy barrier introduced by a thick SEI layer when operating the electrochemical cell and recover lithium from the lithiated silicon particle fragments to fully utilize lithium from the lithium reservoir in the negative electrode. For example, as illustrated in FIG. 2, in state (i) prior to operation, a negative electrode can include lithiated silicon ($Li_xSi$) particles 101 surrounded by carbon black particles 103. As the electrochemical cell operates, for example, at an operating voltage of 3 volts to 4.2 volts, undergoing charging and discharging, the lithiated silicon particle can experience expansion and contraction resulting in degradation and pulverization of the lithiated silicon ($Li_xSi$) particle from state (i) to state (ii) thereby forming a lithiated silicon ($Li_xSi$) particle fragment 105 in state (ii). Further degradation of the lithiated silicon particle continues as the electrochemical cell operates. For example, as the electrochemical cell operates at a voltage of about 3 volts from state (ii) to state (iii), further lithiated silicon ($Li_xSi$) particle fragments 105 can break off from silicon ($Li_ySi$) particles 102, which can be covered by an SEI layer and trap lithium within it such that lithium cannot be released back into the negative electrode's electroactive material. However, if the operating voltage of the electrochemical cell is lowered, for example, to about 2.5 volts-4.2 volts, from state (iii) to state (iv) and state (iv) to (v), it was discovered that at least a portion of lithium can be released from lithiated silicon ($Li_zSi$) particle fragments 110 and utilized in the negative electrode's electroactive material (e.g., lithiated silicon ($Li_xSi$) particles 101).

In any embodiment, the electrochemical cell described herein is capable of operating at a lower operating voltage or operating voltage range as described above at the start of operation of the electrochemical cell, for example, at least during a first cycle (a first discharge and charge) as well as during and including subsequent cycles (e.g., 5 cycles, 10 cycles, 25 cycles, 50 cycles, 75 cycles, 100 cycles, 200 cycles, etc.). It is contemplated herein that the electrochemical cell can operate at a lower operating voltage or operating voltage range as described above during the formation cycle and/or throughout the entire operation of the electrochemical cell. Additionally or alternatively, the electrochemical cell described herein is capable of operating at a lower operating voltage as described above once discharge capacity of the electrochemical cell is less than or equal to about 90%, less than or equal to about 80%, less than or equal to about 70%, less than or equal to about 60%, or less than or equal to about 50%; or from about 50% to about 90%, about 60% to about 90%, about 70% to about 90%, or about 80% to about 90%. For example, the electrochemical cell may be operated at a higher operating voltage window (a first operating voltage range), e.g., 3 volts to 4.2 volts or at about 3 volts, for example, from the start of operating. However, once discharge capacity of the electrochemical cell is less than or equal to about 90%, the electrochemical cell may be operated at a lower operating voltage window (a second operating range), e.g., 2.5 volts to 4.2 volts or at about 3 volts. It is also contemplated herein that the electrochemical cell may then be operated at the higher operating voltage window following operation at the lower operating voltage window and so forth. Operation of the electrochemical cell may alternate between a higher operating voltage/higher operating voltage window and a lower operating voltage/lower operating voltage window. A control system, as understood by a person of ordinary skill in the art, which is in communication with the electrochemical cell can be configured to control the voltage, current, and power of the electrochemical cell during operation and change the voltage, as needed, for example, as described above, when discharge capacity is less than or equal to 90%, etc.

Methods of operating an electrochemical cell as described herein are also provided. The method can include operating the electrochemical cells as described herein at a lower operating voltage as described herein, for example, about 2 volts to about 4.5 volts or about 2.5 volts to about 4.2 volts, at the start of operation of the electrochemical cell, for example, at least during a first cycle as well as during and including subsequent cycles (e.g., 5 cycles, 10 cycles, 25 cycles, 50 cycles, 75 cycles, 100 cycles, 200 cycles, etc.). Additionally or alternatively, the electrochemical cell may be operated at a first operating voltage or at a first operating voltage range and a second operating voltage or a second operating voltage range. The first operating voltage is greater than the second operating voltage. Additionally, a lower limit of the first operating voltage ranger is greater than a lower limit of the second operating voltage range. An upper limit of the first operating voltage range may be the same, greater than, or less than an upper limit of the second operating voltage range. For example, the first operating voltage may be 3 volts and the second operating voltage may be 2.5 volts, or the first operating voltage range may be 3 volts to 4.2 volts and the second operating voltage range may be about 2.5 volts to about 4.2 volts. The electrochemical cell can operate at the first operating voltage or the first operating voltage range until, for example, the discharge capacity of the electrochemical cell decreases to a designated value (e.g., 90% or less), and then the electrochemical cell can operate at the second operating voltage or the second operating voltage range. For example, the electrochemical cell can operate at the first operating voltage or the first operating voltage range from the start of operation and once the discharge capacity of the electrochemical cell is less than or equal to about 90%, the electrochemical cell may be operated at the second operating voltage or the second operating voltage range. It is also contemplated herein that the electrochemical cell may be operated at the first operating voltage or the first operating voltage range following operation at the second operating voltage or the second operating voltage range and so forth. Operation of the electrochemical cell may alternate between the first operating voltage or the first operating voltage range and the second operating voltage or the second operating voltage range, and so on. It is contemplated herein that the electrochemical cell can be capable of operating at or be operated at the above-described voltages versus a lithium reference electrode. Thus, the electrochemical cells provided herein may further include a lithium reference electrode.

Methods of preparing an electrochemical cell are also provided. In various aspects, the total reversible lithium in the electrochemical cell should correspond to about 50% to about 70% of capacity of the negative electrode after a formation cycle in order to maintain an operating voltage and amount of lithium in the negative electrode such that stress to the negative electrode is lower (i.e., compressive). The method includes forming a silicon-containing negative electrode (e.g., negative electrode 22) comprising prelithiating a silicon-containing electroactive material with an amount of lithium to form a prelithiated electroactive material comprising a lithium silicide. The amount of lithium can be determined based on the following determined parameters of the electrochemical cell: (i) a positive electrode areal capacity; (ii) a negative electrode capacity to a positive electrode capacity for lithium (N/P) ratio of the electrochemical cell; (iii) a first cycle capacity loss of the electrochemical cell; and (iv) a state of charge of the silicon-containing negative electrode. The first cycle capacity loss refers to the difference between charge capacity and discharge capacity in the first cycle. For example, if for a first cycle, the measured charge capacity is 5 mAh/cm$^2$ and the discharge capacity is 4.5 mAh/cm$^2$, the first cycle efficiency is 4.5/5×100%, i.e., 90%, and the first cycle capacity loss would be 10%. For state of charge, if the capacity of the negative electrode is 10 mAh/cm$^2$, if it is charged it to 5 mAh/cm$^2$, the state of charge would be 5/10×100%, i.e., 50% of state of charge.

Thus, the amount of lithium to be included in the negative electrode via prelithiation can be determined by knowing: (i) a suitable positive electrode areal capacity; (ii) a suitable negative electrode capacity to a positive electrode capacity for lithium (N/P) ratio of the electrochemical cell; (iii) a suitable first cycle capacity loss of the electrochemical cell; and (iv) a suitable state of charge of the silicon-containing negative electrode. The aforementioned parameters (i)-(iv) can be assumed and/or predicted as based on desired performance characteristics of the electrochemical cell as understood by one of ordinary skill in the art, for example, using reference electrodes.

In any embodiment, a suitable positive electrode capacity can be greater than or equal to about 1 mAh/cm$^2$, greater than or equal to about 2 mAh/cm$^2$, greater than or equal to about 4 mAh/cm$^2$, greater than or equal to about 6 mAh/cm$^2$, greater than or equal to about 8 mAh/cm$^2$, or about 10 mAh/cm$^2$, or from about 1 mAh/cm$^2$ to about 10 mAh/cm$^2$, about 1 mAh/cm$^2$ to about 8 mAh/cm$^2$, about 1 mAh/cm$^2$ to about 6 mAh/cm$^2$, about 1 mAh/cm$^2$ to about 4 mAh/cm$^2$ about 1 mAh/cm$^2$ to about 2 mAh/cm$^2$, about 2 mAh/cm$^2$ to about 10 mAh/cm², about 2 mAh/cm² to about 8 mAh/cm², about 2 mAh/cm² to about 6 mAh/cm², about 4 mAh/cm² to about 8 mAh/cm², or about 4 mAh/cm² to about 6 mAh/cm².

A suitable N/P ratio can be greater than or equal 1, greater than or equal to about 1.1, greater than or equal to about 1.3, greater than or equal to about 1.5, greater than or equal to about 1.7, greater than or equal to about 1.9, greater than or equal to about 2.2, greater than or equal to about 2.4 or about 2.6; or from about 1 to about 2.6, about 1.1 to about 2.6, about 1.1 to about 2.4, about 1.3 to about 2.2, about 1.5 to about 2.2, or about 1.7 to about 2.2.

A suitable first cycle capacity loss can be greater than or equal to about 5%, greater than or equal to about 10%, greater than or equal to about 20%, greater than or equal to about 30%, greater than or equal to about 40%, greater than or equal to about 50%, or about 60%; or from about 5% to about 60%, about 10% to about 50%, about 10% to about 40%, about 10% to about 30%, or about 10% to about 20%.

A suitable state of charge of the silicon-containing negative can be greater than or equal to 10%, greater than or equal to 20%, greater than or equal to 30%, greater than or equal to 40%, greater than or equal to 50%, greater than or equal to 60%, or about 70%; or from about 10% to about 70%, about 20% to about 70%, about 30% to about 70% or about 50% to about 70%.

An electrochemical cell prepared according the methods described herein is capable of operating or can operate at an operating voltage as described above. An electrochemical cell can operate, for example, at an operating voltage about 2 volts to about 4.5 volts at the start of operation of the electrochemical cell, for example, at least during a first cycle (a first discharge and charge) as well as during and including subsequent cycles (e.g., 5 cycles, 10 cycles, 25 cycles, 50 cycles, 75 cycles, 100 cycles, 200 cycles, etc.). Additionally or alternatively, the prepared electrochemical cell described herein is capable of operating or can operate at a lower operating voltage as described above, for example, about 2 volts to about 4.5 volts, once discharge capacity of the electrochemical cell is less than or equal to about 90%, less than or equal to about 80%, less than or equal to about 70%, less than or equal to about 60%, or less than or equal to about 50%; or from about 50% to about 90%, about 60% to about 90%, about 70% to about 90%, or about 80% to about 90%.

In any embodiment, the amount of lithium in terms of a capacity corresponding to the amount of lithium can be determined according to equation (i):

$$C_{pre-Li} = C_p(R_{n/p} \times E_{fc} + X\% \times R_{n/p} - 1) \quad (i)$$

wherein:
$C_{pre-Li}$ is a capacity corresponding to the amount of lithium (mAh/cm²);
$C_p$ is the positive electrode areal capacity;
$R_{n/p}$ is the N/P ratio;
$E_{fc}$ is the first cycle capacity loss (converted to a fractional percent for use in equation (i)); and
X % is the state of charge of the silicon-containing negative electrode (converted to a fractional percent for use in equation (i)).

For example, assuming the following:
a positive electrode capacity ($C_p$) is 4.6 mAh/cm²,
an N/P ratio ($R_{n/p}$) is 2,
first cycle capacity loss ($E_{fc}$) is 20%, and
state of charge of the silicon-containing negative electrode (X %) is 60%,
then the capacity corresponding to the amount of Li for the prelithiation ($C_{pre-Li}$)=4.6 mAh/cm²×(2×0.2+0.6×2−1)= 2.76 mAh/cm².

In further embodiments, another method of preparing an electrochemical cell is provided herein, wherein the electrochemical cell is capable of operating in a designated operating voltage. The method includes (a) determining an amount of lithium to prelithiate a silicon-containing electroactive material for forming a silicon-containing negative electrode and determining a negative electrode capacity to a positive electrode capacity for lithium (N/P) ratio of the electrochemical cell, and (b) prelithiating the silicon-containing electroactive material with the amount of lithium determined in step (a) to form a pre-lithiated electroactive material comprising a lithium silicide. Determining the lithium amount and determining the N/P ratio are based on the following parameters: (i) a determined minimum fractional lithium occupancy, (ii) a determined maximum fractional lithium occupancy, (iii) a determined first cycle efficiency of the silicon-containing negative electrode, and (iv) a determined first cycle efficiency of the positive electrode. In other words, by determining (i) a minimum fractional lithium occupancy, (ii) a maximum fractional lithium occupancy, (iii) a first cycle efficiency of the silicon-containing negative electrode, and (iv) a first cycle efficiency of the positive electrode, the lithium amount and the N/P ratio for an electrochemical cell can be determined and the electrochemical cell can be designed accordingly. For example, a silicon-containing electroactive material can be prelithiated with the determined lithium amount to form prelithiated electroactive material for the negative electrode. Additionally, the silicon-containing electroactive material and the electroactive material (second electroactive material) for the positive electrode can be selected such that the negative electrode and the positive electrode can be formed so that the electrochemical cell has the determined N/P ratio. The aforementioned parameters (i)-(iv) can be assumed and/or predicted as based on desired performance characteristics of the electrochemical cell as understood by one of ordinary skill in the art, for example, using reference electrodes.

The method can include determining a first cycle efficiency of the negative electrode ($\eta_n$) and a first cycle efficiency of the positive electrode ($\eta_p$). The first cycle efficiency of the negative electrode can be determined by dividing the first cycle discharge capacity for the negative electrode by the first cycle charge capacity for the negative electrode. Similarly, the first cycle efficiency of the positive electrode can be determined by dividing the first cycle discharge capacity for the positive electrode by the first cycle charge capacity for the positive electrode. The prelithiation loading or amount of lithium (Ø) corresponds to the prelithiation capacity ($Q_{PL}$), for example, how much lithium is added, and the reversible negative capacity ($Q_n$), which is measured after the first cycle, as follows in equation (ii):

$$\emptyset = Q_{PL}/Q_n \quad (ii).$$

The relationship between N/P ratio (NP) to the first cycle efficiency of the negative electrode ($\eta_n$) and the first cycle efficiency of the positive electrode ($\eta_p$) may be represented by equation (iii).

$$Z = 1/\eta_p - NP(1/\eta_n - 1) \quad (iii)$$

The minimum amount of lithium ($\emptyset_{min}$) required for prelithiation in order to utilize the positive capacity fully and compensate for the first cycle negative capacity loss can be represent by equation (iv):

$$\emptyset_{min} = (1-Z)/NP \quad (iv).$$

The method can further including determining a designated operating voltage operating window of the negative electrode, for example, from factors such as particle stress and electrolyte reactions such that stress to the negative electrode is minimal.

Figure 3:
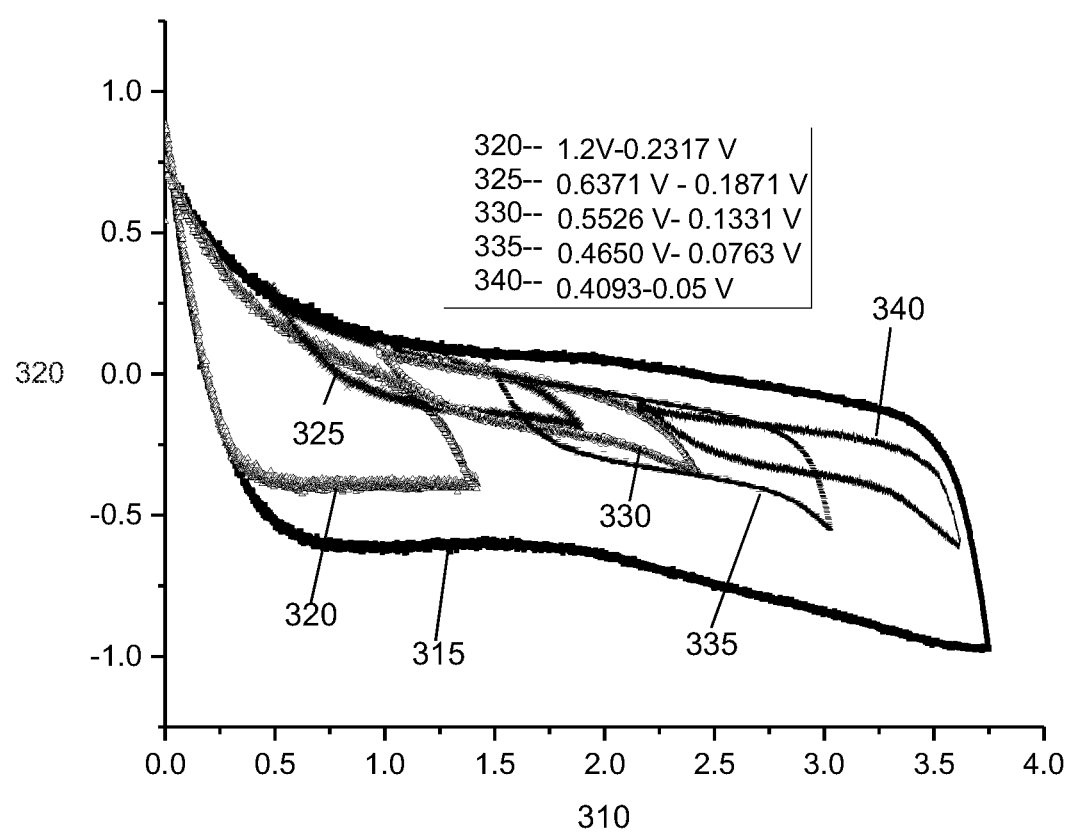
FIG. 3 is a graph depicting stress (GPa) versus the lithium content (x) in LixSi for the electrochemical cells including a lithium-silicon thin-film negative electrode (thickness 100 nm) and the lithium counter/reference electrode operated at full potential window and at preset potential windows.

For example, FIG. 3 provides stress data for lithium silicon electrodes as described in Example 2 of U.S. Pat. No. 10,141,569, which is incorporated herein by reference in its entirety. In FIG. 3, the x-axis (310) is the x in $Li_xSi$ and the y-axis (320) is measured stress (GPa) with curve 315 representing a full cycle, and curves 320, 325, 330, 335, and 340 representing various voltage windows tested. As shown in FIG. 3, curve 330 represents the lowest stress, bounded by x=1 and x=2.4 (x in $Li_xSi$). If the data is represented in a linear z-scale such that z=0 when x=0 and z=1 when x=3.75, then curve 330 lies between z=0.27 and z=0.64, which can be designated as $z_{min}$ and $z_{max}$, respectively. Thus, a designated operating voltage operating window can be represented by a minimum fractional lithium occupancy ($z_{min}$) and a maximum fractional lithium occupancy ($z_{max}$) for the designated operating window of the negative electrode. The minimum fractional lithium occupancy ($z_{min}$) and the maximum fractional lithium occupancy ($z_{max}$) are related to the first cycle efficiency of the negative electrode ($\eta_n$) and the first cycle efficiency of the positive electrode ($\eta_p$), N/P ratio (NP), and prelithiation loading ($\Phi$) as show below in equations (v) and (vi):

$$z_{min} = \frac{NP\phi + Z - 1}{NP} \quad (v)$$

$$z_{max} = \frac{NP\phi + Z}{NP}. \quad (vi)$$

Thus, when $\eta_n$, $\eta_p$, $z_{min}$, and $z_{max}$ are known, equations (v) and (vi) can be solved for Ø and NP as follows:

$$NP = \frac{1}{z_{max} - z_{min}} \quad (vii)$$

$$\phi = z_{max} - \frac{Z}{NP}. \quad (viii)$$

In the example described above where $z_{min}$=0.27 and $z_{max}$=0.64, using equations (vii) and (viii) results in an NP of 2.7 and a φ of 39%. If, for example, the reversible negative electrode capacity is 9 mAh/cm², the amount of Li for prelithiation can be calculated from Equation (ii) as 9 mAh/cm²×0.39=3.51 mAh/cm².

Once the amount of lithium is determined in the above-described methods, prelithiating may be performed by any well-known technique in the art wherein silicon-containing electroactive material can be prelithiated with the determined amount of lithium to form the prelithiated electroactive material. Suitable prelithiation methods include, but are not limited to electrochemical prelithiation, thermal evaporation of lithium, use of stabilized lithium metal powder, Si—Li alloying, and sacrificing auxiliary Li metal electrode to prelithiate during formation cycle, for example, as described in U.S. Pat. No. 10,593,988, which is incorporated by reference in its entirety. The aforementioned prelithiating methods are well known in the art. For example, electrochemical prelithiation can include pairing a lithium metal electrode with a silicon-containing negative electrode in a electrochemical cell and inserting a desired amount of lithium into the silicon-containing electrode. Thermal evaporation of lithium can include using copper as a substrate and placing the copper substrate into a thermal evaporation system. A lithium source can be heated beneath the copper substrate at a temperature above lithium's metal melting point, and lithium can be evaporated on the copper substrate. Using stabilized lithium metal powder can include spraying spray lithium metal powder onto a silicon-containing electrode surface, and calendering at 100° C. followed by pressing the silicon-containing electrode.

In some embodiments, prelithiating includes reacting a lithiating agent, e.g., lithium hydride, with the silicon-containing electroactive material to form the prelithiated electroactive material. In various embodiments, the silicon-containing electroactive material may be silicon, silicon oxides, and silicon containing binary and ternary alloys, such as Si—Sn, SiSnFe, SiSnAl, SiFeCo, and the like. In certain embodiments, the silicon-containing electroactive material comprises or consists essentially of silicon (rather than an alloy of silicon) in either crystalline or amorphous structures.

The silicon-containing electroactive material may have a round geometry or an axial geometry and thus may be in the form of particles or in alternative variations, may be in the form of thin film, nanowires, nanorods, nanosprings, or hollow tubes. The silicon-containing electroactive material structures, e.g., silicon structures, may be nanometer sized or micrometer sized. Such silicon structures can help accommodate the large volume changes that silicon undergoes during lithium cycling in a lithium ion battery. The term "axial geometry" refers to particles generally having a rod, fibrous, or otherwise cylindrical shape having an evident long or elongated axis. Generally, an aspect ratio (AR) for cylindrical shapes (e.g., a fiber or rod) is defined as AR=L/D where L is the length of the longest axis and D is the diameter of the cylinder or fiber. Exemplary axial-geometry electroactive material particles suitable for use in the present disclosure may have high aspect ratios, ranging from about 10 to about 5,000, for example. In certain variations, the electroactive material particles having an axial-geometry include fibers, wires, flakes, whiskers, filaments, tubes, rods, and the like.

The term "round geometry" typically applies to particles having lower aspect ratios, for example, an aspect ratio closer to 1 (e.g., less than 10). It should be noted that the particle geometry may vary from a true round shape and, for example, may include oblong or oval shapes, including prolate or oblate spheroids, agglomerated particles, polygonal (e.g., hexagonal) particles or other shapes that generally have a low aspect ratio. Oblate spheroids may have disc shapes that have relatively high aspect ratios. Thus, a generally round geometry particle is not limited to relatively low aspect ratios and spherical shapes. For generally round geometry electroactive material particles, an average particle size diameter of a suitable silicon-containing particle may be greater than or equal to about 20 nm to less than or equal to about 100 μm, optionally greater than or equal to about 50 nm to less than or equal to about 20 μm, optionally greater than or equal to about 100 nm to less than or equal to about 10 μm, by way of non-limiting example.

Formation of the prelithiated electroactive material during the reacting step can be accomplished by heating (e.g., in an oven, in a furnace, and the like) the lithiating agent (e.g., first lithiating agent, second lithiating agent) and the silicon-containing electroactive material (e.g., first electroactive material, second electroactive material) to a suitable temperature in the presence of a first inert gas. The heating duration may vary as determined by a person of ordinary skill in the art to achieve the reaction. The lithiating agent and the electroactive material may be heated to a temperature from about 350° C. to about 1000° C., about 400° C. to about 900° C., about 450° C. to about 800° C., about 500 C to about 700° C., or about 550° C. to about 600° C.

Additionally or alternatively, formation of the prelithiated electroactive material can be accomplished by mechanically alloying the silicon-containing electroactive material and the lithiating agent in the presence of a second inert gas. In any embodiment, mechanical alloying can include a milling procedure as known in the art, for example, high energy ball milling. The type of mill, milling container, milling speed, milling time, type, size, and size distribution of the grinding medium, ball-to-powder weight ratio, milling atmosphere, and milling temperature can be adjusted as needed by a person of ordinary skill in the art. Non-limiting examples of first and second inert gases include nitrogen, helium, and argon. The first and second inert gases may be the same or different. Optionally, the lithiating agent and the electroactive material may be pressed, for example, into a pellet, prior to the reacting step, for example, prior to heating.

In further aspects, the methods described herein may include forming a positive electrode comprising a second electroactive material. The second electroactive material may be selected from the group consisting of: $Li_{(1+x)}Mn_2O_4$, where $0.1 \le x \le 1$; $LiMn_{(2-x)}Ni_xO_4$, where $0 \le x \le 0.5$; $LiCoO_2$; $Li(Ni_xMn_yCo_z)O_2$, where $0 \le x \le 1$, $0 \le y \le 1$, $0 \le z \le 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \le x \le 1$, $0 \le y \le 1$, $0 \le z \le 1$, $0 \le P \le 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur (e.g., greater than 60 wt % based on total weight of the positive electrode), and combinations thereof.

Additionally or alternatively, the methods described herein may further include admixing electrically conductive material or particles (also known as conductive filler material) with the prelithiated electroactive material. Suitable electrically conductive material are well known to those of skill in the art and include, but are not limited to, carbon black, graphene, graphene nanoplatelet, graphite, carbon nanotubes, carbon fibers, graphene, graphene oxide, nitrogen-doped carbon, metallic powder (e.g., copper, nickel, steel), liquid metals (e.g., Ga, GaInSn), and combinations thereof. Such electrically conductive material in particle form may have a round geometry or an axial geometry as described above. In some embodiments, admixing of the electrically conductive material with the pre-lithiated electroactive material can include coating at least a portion of the prelithiated electroactive material with at least a portion of the electrically conductive material. The electrically conductive material can surround at least a portion of the electroactive material particles.

In additional embodiments, the method may further include admixing a polymeric binder with the prelithiated electroactive material and the electrically conductive material. It is also contemplated herein that additional electroactive material as described herein may also be admixed with the prelithiated electroactive material. The polymeric binder may be any suitable binder for use in a positive electrode, a negative electrode, and a combination thereof. Examples of a suitable polymeric binder, include, but are not limited to, poly(ether imide) (PEI), polyacrylic acid (PAA), poly(amic acid), polysulfone (PSF), polyphenylsulfone (PPSF), polyethersulfone (PESF), polyamide, polyvinylidene fluoride (PVDF), polyacrylonitrile (PAN), a polyolefin, cellulose, derivatives of cellulose (carboxymethoxyl cellulose (CMC)), cellulose acetate, pitch, lignin, polyalkylene oxide (PAO) (e.g., polyethyleneoxide (PEO) or polypropylene oxide (PPO), etc.), polyvinylidene difluoride (PVDF), polymethylmethacrylate (PMMA), polyimide (PI), polyvinylidene fluoride (PVDF), ethylene propylene diene monomer (EPDM) rubber, copolymers, and combinations thereof. As used herein, the term "polymeric binder" includes polymer precursors used to form the polymeric binder, for example, monomers or monomer systems that can form the any one of the polymeric binders disclosed above. The electrically conductive material can be admixed with the polymeric binder and the prelithiated electroactive material, so that the electrically conductive material is distributed throughout an electrode matrix. Notably, the electrically conductive material is typically dispersed in the polymeric binder matrix as in a typical composite. Preferably, the electrically conductive material and prelithiated electroactive material are well mixed into the polymeric binder for even distribution (e.g., homogeneous distribution) and therefore even electrical conductivity.

The polymeric binder, prelithiated electroactive material, and electrically conductive material can be blended or mixed by equipment known in the art, such as for example, magnetic stirrers, mixers, kneaders, and the like. In some embodiments, a solvent or one or more vehicles may be admixed with the polymeric binder, prelithiated electroactive material, and optional electrically conductive material to form a mixture. The handling and flowability of a mixture of polymeric binder, prelithiated electroactive material, and optional electrically conductive material can be dependent on the polymer or polymer precursor selected, the viscosity of the solvent/carriers, as well as a rate of crosslinking. Non-limiting examples of suitable solvents include N-methyl-2-pyrrolidone (NMP), dimethylformamide (DMF), dimethyl sulfoxide (DMSO), propylene carbonate (PC), acetonitrile (CAN), tetrahydrofuran (THF) and combinations thereof. In some embodiments, the solvent may be aprotic, preferably polar. The mixture may be applied to a current collector and the solvent may be volatilized at a suitable temperature to form an electrode. Optionally, the electrode may be pressed or calendered to reduce the porosity of the electrode. Depending on pore size, suitable porosities may range from greater than or equal to about 20% to less than or equal to about 80% porosity for an electrode (prior to being imbibed with any electrolyte).

In any embodiment, the mixture may comprise a weight ratio of pre-lithiated electroactive material to polymeric binder of about 50:1 to about 1:10, for example, about 25:1, about 10:1, about 5:1 about 2:1, about 1:1, about 2:3, about 3:2, or about 1:2. In some embodiments, prelithiated electroactive material may be present in the negative electrode or mixture in an amount, based on total weight of the negative electrode or mixture, of about 10 wt % to about 98 wt %, about 50 wt % to about 90 wt %, or about 70 wt % to about 90 wt %. Additionally or alternatively, the polymeric binder may be present in the negative electrode or mixture in an amount, based on total weight of the negative electrode or mixture, of about 2 wt % to about 25 wt %, about 10 wt % to about 25 wt %, or about 5 wt % to about 15 wt %. Additionally or alternatively, the electrically conductive material may be present in the negative electrode or mixture in an amount, based on total weight of the negative electrode or mixture, of about 2 wt % to about 25 wt %, about 10 wt % to about 25 wt %, or about 5 wt % to about 15 wt %

The methods disclosed herein are especially well-suited to maximizing specific power and energy density of electrochemical cells, such as lithium ion batteries. Therefore, the inventive electrode materials have certain advantages, like high energy density and high rate capabilities.

EXAMPLES

Unless otherwise indicated silicon particles were used as the electroactive material in the cells formed in the below examples.

Example 1

Figure 4:
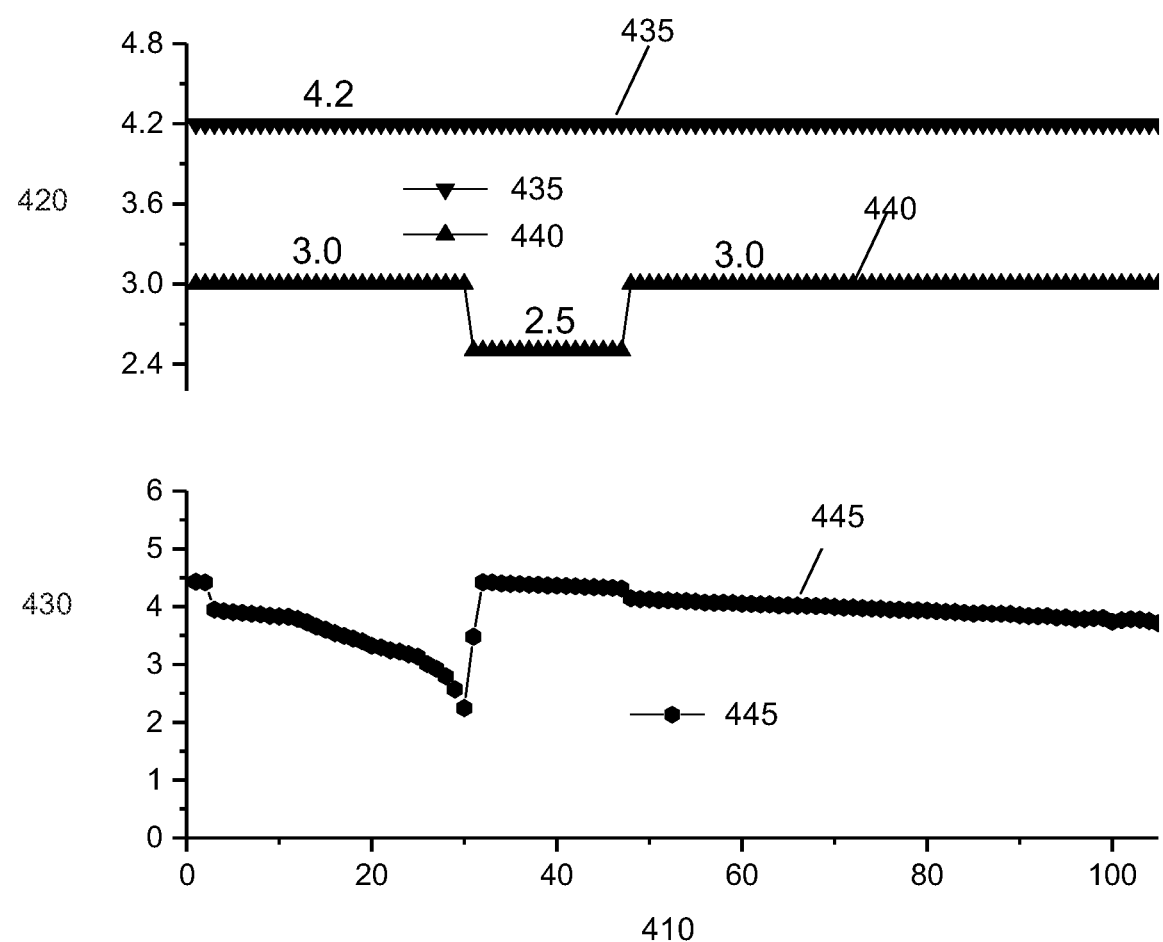
FIG. 4 is a graph depicting voltage (V) and discharge capacity ($mAh/cm^2$) versus cycle number for electrochemical cells formed according to Example 1.

A silicon negative electrode (anode) and $LiNi_{0.6}Mn_{0.2}Co_{0.2}O_2$ (NMC622) positive electrode (cathode) with an N/P ratio of 2 were used and assembled into (2032) coin cells with 1M $LiPF_6$ in fluoroethylene carbonate/ethyl methyl carbonate (FEC/EMC) as the electrolyte. Before assembly, the silicon electroactive material was prelithiated with 4 mAh/cm$^2$ lithium. The cells were cycled with the rate of C/10 for 2 formation cycles and a rate of C/5 for charge-discharge. The results are shown in FIG. 4. In FIG. 4, the x-axis (410) is cycle number, while voltage (V) is shown on the upper y-axis (420) and discharge capacity (mAh/cm$^2$) is shown on the lower y-axis (430). FIG. 4 shows a voltage upper limit (435), a voltage lower limit (440), and discharge capacity (445). For the first 30 cycles between 3.0 to 4.2 volt, the capacity degraded quickly down to half of the capacity due to some of lithiated silicon particles that were isolated. Then the lower cut off voltage was reduced down to 2.5 volt, and the capacity recovered due to the re-arrangement of electrode and electrolyte. After about 10 cycles, the voltage window was switched back to 3.0 to 4.2 volts and the capacity retention became stable.

Example 2

Figure 5:
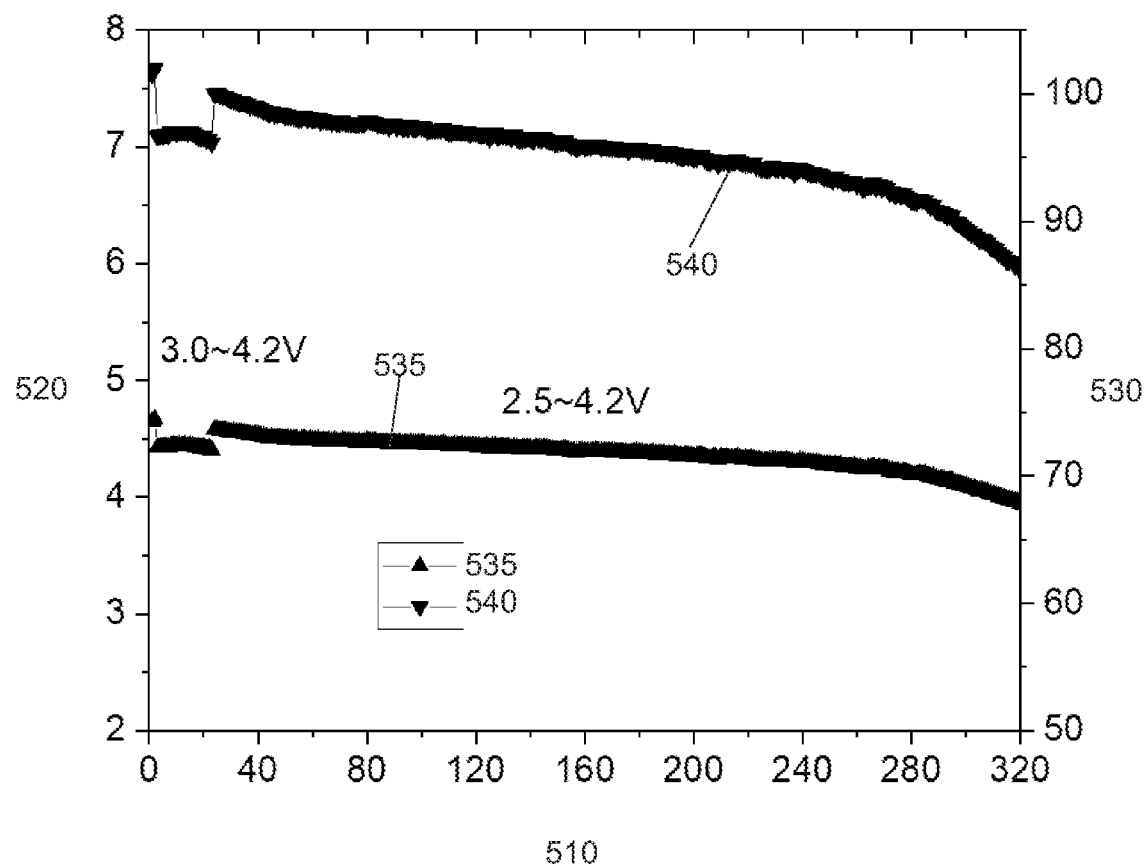
FIG. 5 is a graph depicting discharge capacity ($mAh/cm^2$) and capacity retention versus cycle number for electrochemical cells formed according to Example 2.

A silicon negative electrode (anode) and NMC622 positive electrode (cathode) with an N/P ratio of 2 were used and assembled into (2032) coin cells with 1M $LiPF_6$ in FEC/EMC as the electrolyte. Before assembly, the silicon electroactive material was coated with $Al_2O_3$ by atomic layer deposition and prelithiated with 4 mAh/cm$^2$ Li. The cells were cycled with the rate of C/10 for 2 formation cycles and C/5 for charge-discharge. The results are shown in FIG. 5. In FIG. 5, the x-axis (510) is cycle number, while discharge capacity (mAh/cm$^2$) is shown on the left hand y-axis (520) and capacity retention is shown on the right hand y-axis (530). Capacity retention is capacity of cycle "n" divided by second cycle capacity. FIG. 5 shows discharge capacity (535) and capacity retention (540). For the first 20 cycles, the voltage was between 3.0 to 4.2 volts. After 20 cycles, the cut off voltage was lowered down to 2.5 volts, the specific capacity increases and capacity retention becomes stable.

Example 3

Figure 6:
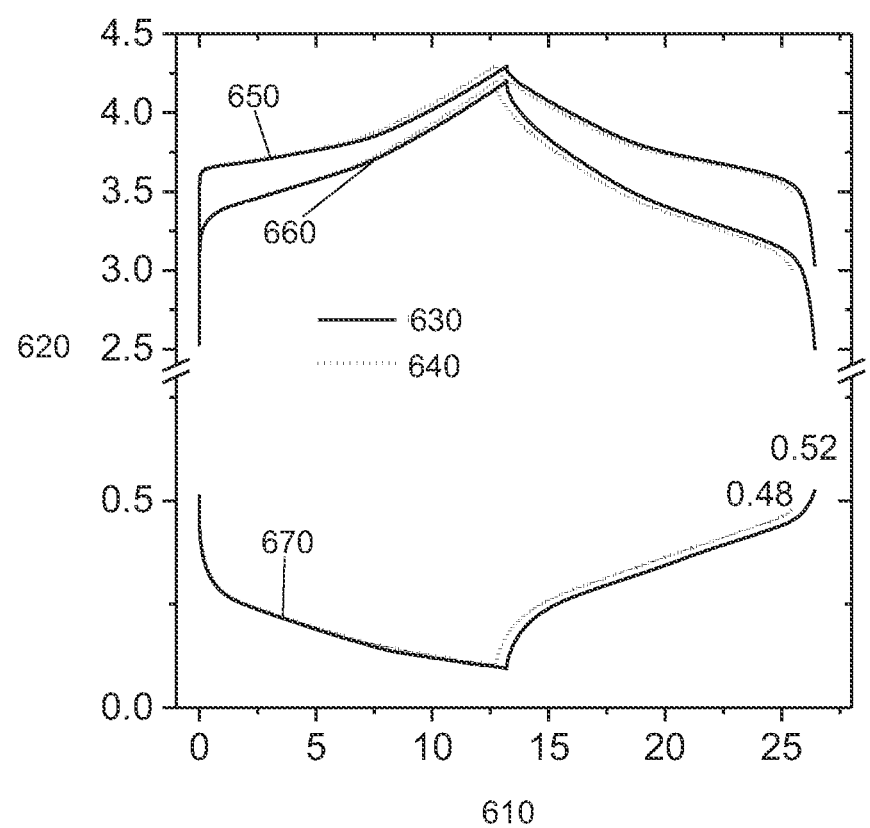
FIG. 6 is a graph depicting voltage (V) versus time (hours) for the NMC622 positive electrode, the 3 electrode cell, and the silicon negative electrode according to Example 3.

A 3 electrode cell was assembled with a silicon negative electrode (anode), NMC622 positive electrode (cathode) with an N/P ratio of 2, and a lithium ring was as the reference electrode. The 3 electrode cell included 1M $LiPF_6$ in FEC/EMC as the electrolyte. Before assembly, the silicon electroactive material was coated with $Al_2O_3$ by atomic layer deposition and prelithiated with 4 mAh/cm$^2$ Li. The cells were cycled with the rate of C/10 for 2 formation cycles and C/5 for charge-discharge. The voltage profiles for each of the silicon negative electrode, the NMC622 positive electrode, and full cell were recorded under C/5 rate, each at a voltage of 2.5 V to 4.2 V and 3 V to 4.2 V. The results are shown in FIG. 6. In FIG. 6, the x-axis (610) is time (hours), while voltage (V) is shown on the y-axis (620). FIG. 6 shows the curves 650 for the NMC622 positive electrode, the curves 660 for the 3 electrode cell, and the curves 670 for the silicon negative electrode, where all three solid lines 630 are for the cell cycled from 2.5 V to 4.2 V and all three dash lines 640 are for the cell cycled from 3 V to 4.2 V. This test showed that the electrochemical potential of silicon electrode did not change significantly in different window, indicating the stress could still be maintained in compressive state.

Example 4

Figure 7:
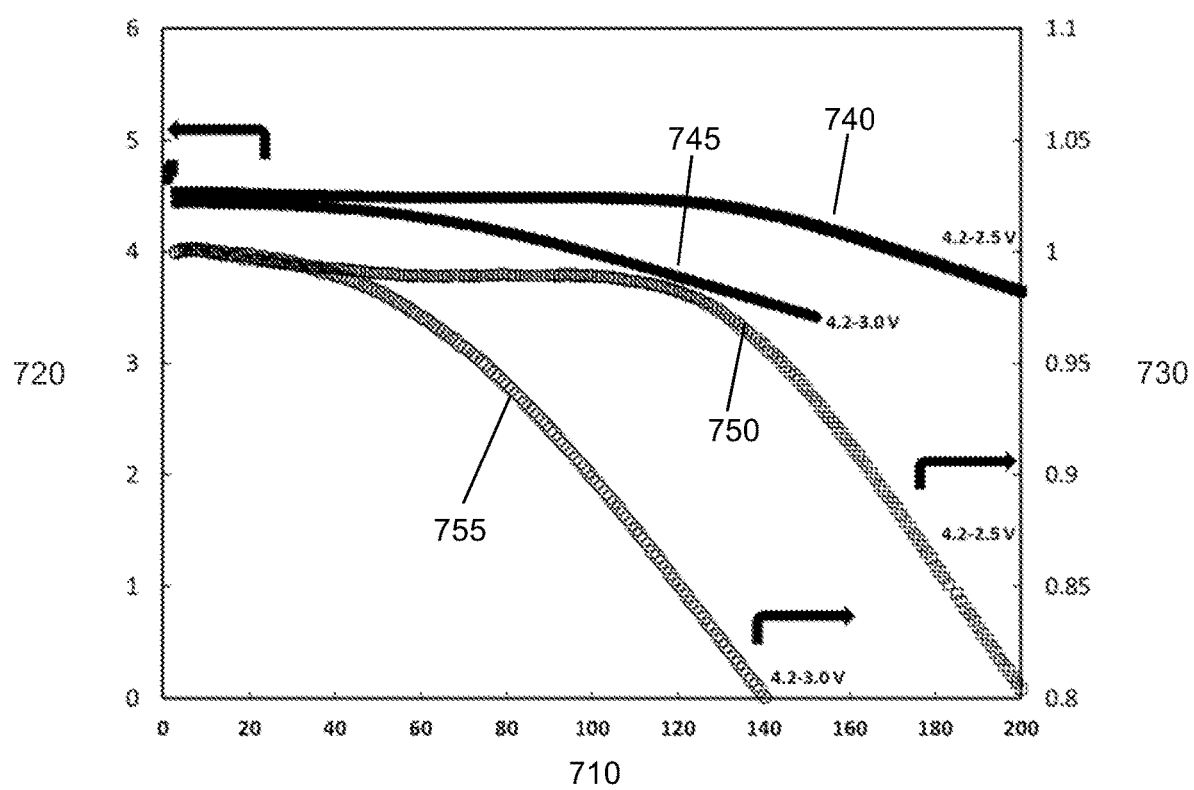
FIG. 7 is a graph depicting discharge capacity ($mAh/cm^2$) and discharge retention versus cycle number for electrochemical cells formed according to Example 4.

Full coin cells (2032) were composed of a NMC 622 positive electrode (cathode) and a prelithiated silicon negative electrode (anode) with an N/P ratio of 2 with 1M $LiPF_6$ in FEC/DMC (1:4 by weight ratio) as electrolyte. The silicon electroactive material was prelithiated with 4 mAh/cm$^2$ Li. The cells were tested at C/20 for 2 formation cycles and C/5 for cycling. The cells were charged to 4.2 V and held at 4.2 V until the current decays at C/50. Then the cells were discharged to 3.0/2.5 V. The rest time between charge and discharge was 15 minutes. The results are shown in FIG. 7. In FIG. 7, the x-axis (710) is cycle number, while discharge capacity (mAh/cm$^2$) is shown on the left hand y-axis (720) and discharge retention is shown on the right hand y-axis (730). FIG. 7, shows discharge capacity (740) and (745) for the cell operated at 4.2-2.5 V and the cell operated at 4.2-3.0 V, respectively, and capacity retention (750) and (755) for the cell operated at 4.2-2.5 V and the cell operated at 4.2-3.0 V, respectively. The cell at voltage window of 4.2-3.0 V reached 140 cycles at 80% discharge capacity retention. The cell at voltage window of 4.2-2.5 V reached 200 cycles at 80% discharge capacity retention.

Example 5

Figure 8:
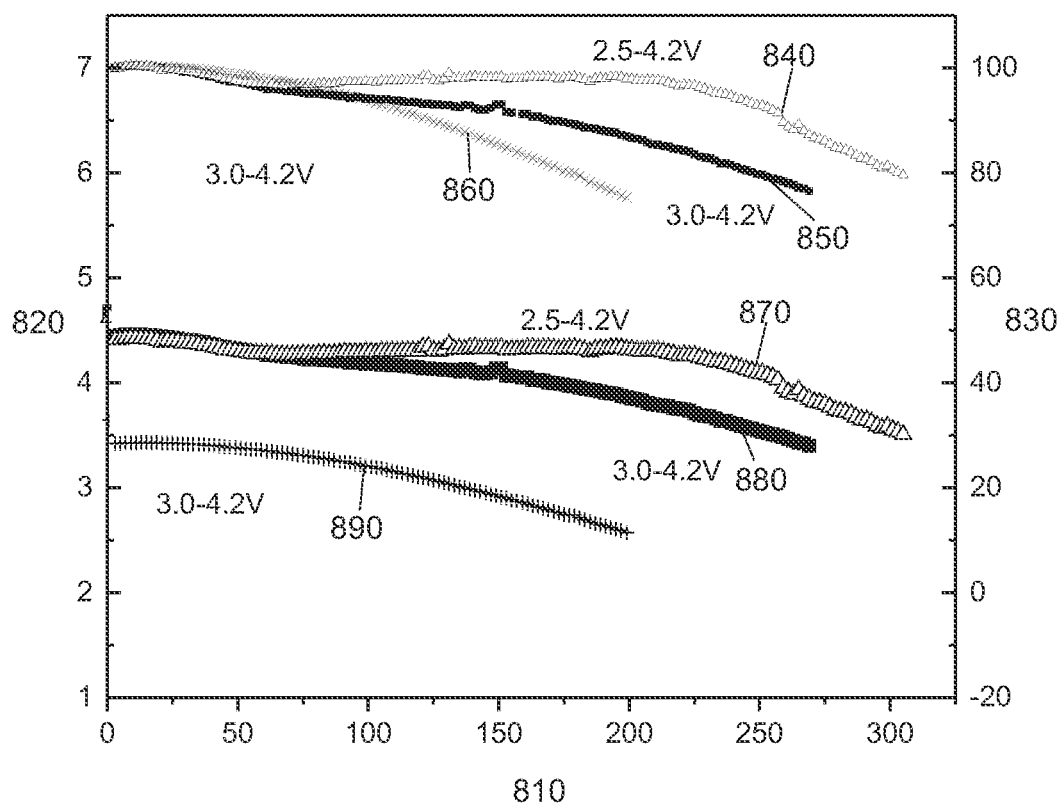
FIG. 8 is a graph depicting areal discharge capacity ($mAh/cm^2$) and discharge capacity retention (%) versus cycle number for electrochemical cells formed according to Example 5.

A carbon-coated silicon negative electrode (anode) and NMC622 positive electrode (cathode) with an N/P ratio of 2 were assembled into 2032 coin cells with 1M $LiPF_6$ in FEC/DMC (1:4 by weight) as the electrolyte. One cell in which the negative electrode was not prelithiated was cycled with the rate of C/20 for 2 formation cycles and C/5 for charge-discharge between 3.0 and 4.2 V. For the other two cells, before assembly, the carbon-coated silicon electroactive material was prelithiated with 4.5 mAh/cm$^2$ Li via an electrochemical method. These prelithiated cells were cycled at 3.0-4.2 V and 2.5-4.2 V, respectively, with the rate of C/20 for 2 formation cycles and C/5 for charge-discharge. The results are shown in FIG. 8. In FIG. 8, the x-axis (810) is cycle number, while areal discharge capacity (mAh/cm$^2$) is shown on the left hand y-axis (820) and discharge capacity retention (%) is shown on the right hand y-axis (830). FIG. 8 shows capacity retention (840), (850), and (860) for the prelithiated cell operated at 2.5-4.2 V, the prelithiated cell operated at 3.0-4.2 V, and the non-prelithiated cell operated at 3.0-4.2 V, respectively, and discharge capacity (870), (880), and (890) for the prelithiated cell operated at 2.5-4.2 V, the prelithiated cell operated at 3.0-4.2 V, and the non-prelithiated cell operated at 3.0-4.2 V, respectively.

Example 6

Figure 9:
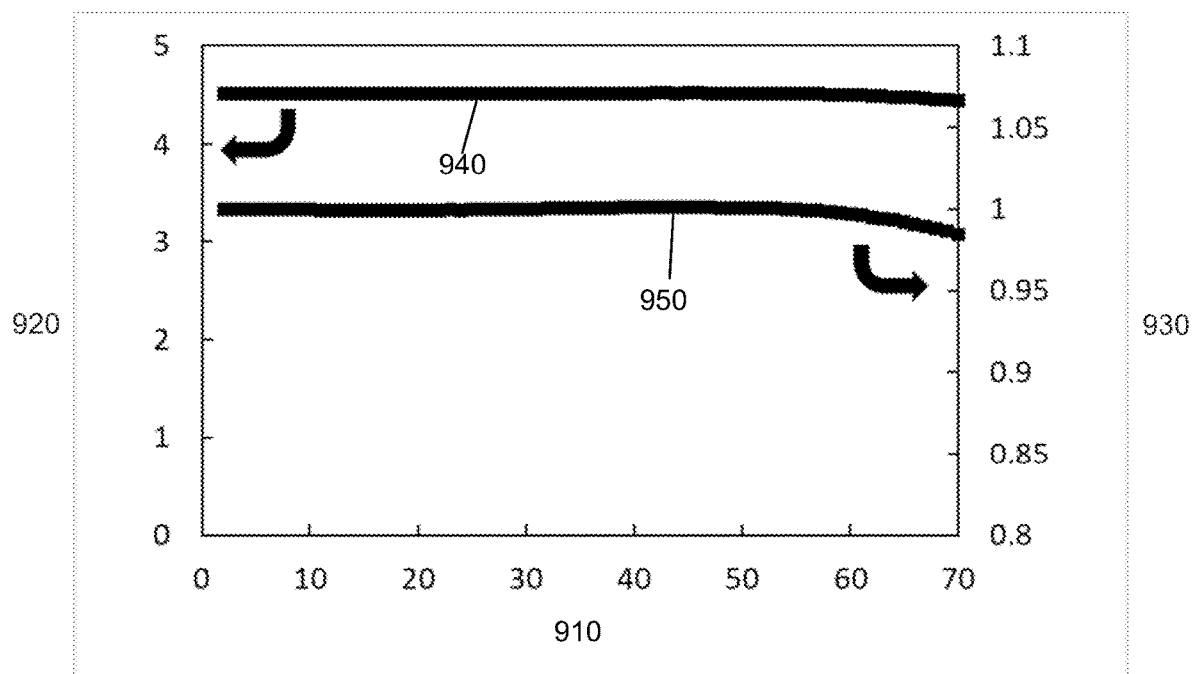
FIG. 9 is a graph depicting discharge capacity ($mAh/cm^2$) and discharge charge capacity retention (%) versus cycle number for pouch electrochemical cells formed according to Example 6.

A pouch cell was composed with a NMC 622 positive electrode (cathode) and a prelithiated silicon negative electrode (anode) with an N/P ratio of 2 with 1M LiPF$_6$ in FEC/DMC (1:4 by weight ratio) as electrolyte. The silicon electrode was prelithiated by with 4 mAh/cm$^2$. The cells were tested at C/20 for 2 formation cycles and C/5 for cycling. The pouch cells were charged to 4.2 V and hold at 4.2 V until the current decay to C/50. Then the cells were discharged to 2.5 V. The rest time between charge and discharge is 30 minutes. The results are shown in FIG. 9. In FIG. 9, the x-axis (910) is cycle number, while discharge charge capacity (mAh/cm$^2$) is shown on the left hand y-axis (920) and discharge charge capacity retention (%) is shown on the right hand y-axis (930). FIG. 9 shows discharge capacity (940) and capacity retention (950). The pouch cell maintained 98.5% of discharge capacity retention at cycle number 70.

Example 7

Figure 10:
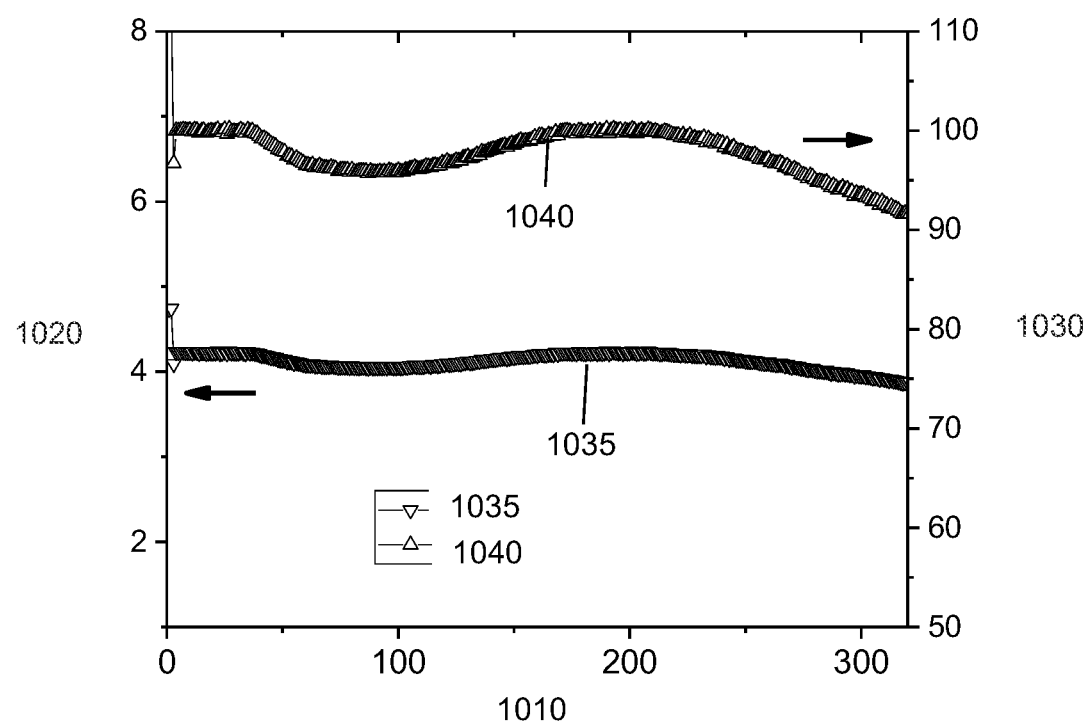
FIG. 10 is a graph depicting discharge capacity ($mAh/cm^2$) and discharge capacity retention (%) versus cycle number for electrochemical cells formed according to Example 7.

Full coin cells (2032) was assembled with a NMC 622 positive electrode (cathode) and a prelithiated silicon negative electrode (anode) with an N/P ratio of 2 with 1M LiPF$_6$ in FEC/DMC as electrolyte. Before assembly, the silicon electroactive material was prelithiated with 4 mAh/cm$^2$ Li. The cells were cycled with the rate of C/10 for 2 formation cycles between 3 to 4.2 volts, C/5 for charge-discharge between 2.5 to 4.2 volts. The results are shown in FIG. 10. In FIG. 10, the x-axis (1010) is cycle number, while discharge capacity (mAh/cm$^2$) is shown on the left hand y-axis (1020) and discharge capacity retention (%) is shown on the right hand y-axis (1030). FIG. 10 shows discharge capacity (1035) and capacity retention (1040). The test results show that the cell can be cycled up to 300 cycles with capacity retention over 80%.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell comprising:
a negative electrode comprising a first electroactive material comprising a lithium silicide, wherein lithium is present in the first electroactive material in an amount corresponding to greater than or equal to about 10% of a state of charge of the negative electrode with the amount of lithium determined by equation (i):

$$C_{pre-Li} = C_p(R_{n/p} \times E_{fc} + X\% \times R_{n/p} - 1) \quad (i)$$

wherein:
$C_{pre-Li}$ is a capacity corresponding to the amount of lithium;
$C_p$ is the positive electrode areal capacity;
$R_{n/p}$ is the N/P ratio;
$E_{fc}$ is the first cycle capacity loss; and
X % is the state of charge of the negative electrode; and
a positive electrode comprising a second electroactive material,
wherein the electrochemical cell has a negative electrode capacity to positive electrode capacity for lithium (N/P) ratio of greater than or equal to about 1, and
wherein the electrochemical cell is capable of operating at an operating voltage of less than or equal to about 5 volts.

2. The electrochemical cell of claim 1, wherein the second electroactive material is selected from the group consisting of: Li$_{(1+x)}$Mn$_2$O$_4$, where 0.1≤x≤1; LiMn$_{(2-x)}$Ni$_x$O$_4$, where 0≤x≤0.5; LiCoO$_2$; Li(Ni$_x$Mn$_y$Co$_z$)O$_2$, where 0≤x≤1, 0≤y≤1, 0≤z≤1, and x+y+z=1; LiNi$_{(1-x-y)}$Co$_x$M$_y$O$_2$, where 0<x<0.2, y<0.2, and M is Al, Mg, or Ti; LiFePO$_4$, LiMn$_{2-x}$Fe$_x$PO$_4$, where 0<x<0.3; LiNiCoAlO$_2$; LiMPO$_4$, where M is at least one of Fe, Ni, Co, and Mn; Li(Ni$_x$Mn$_y$Co$_z$Al$_p$)O$_2$, where 0≤x≤1, 0≤y≤1, 0≤z≤1, 0≤P≤1, x+y+z+p=1 (NCMA); LiNiMnCoO$_2$; Li$_2$FePO$_4$F; LiMn$_2$O$_4$; LiFeSiO$_4$; LiNi$_{0.6}$Mn$_{0.2}$Co$_{0.2}$O$_2$ (NMC622), LiMnO$_2$ (LMO), sulfur, selenium, and a combination thereof.

3. The electrochemical cell of claim 1, wherein the operating voltage is as low as about 2 volts, and the operating voltage is about 2 volts to about 4.5 volts.

4. The electrochemical cell of claim 1, wherein the N/P ratio is about 1.3 to about 3.

5. The electrochemical cell of claim 1, wherein the lithium silicide is lithium silicide particles and the lithium is present in the prelithiated electroactive material in an amount corresponding to greater than or equal to about 10% to about 70% of the state of charge of the negative electrode.

6. The electrochemical cell of claim 1, wherein the electrochemical cell is capable of operating at the operating voltage: (i) during at least a first cycle; (ii) when discharge capacity of the electrochemical cell is less than or equal to 90%; or a combination of (i) and (ii).

7. The electrochemical cell of claim 1, wherein the electrochemical cell is in a state prior to operation.

8. A method of preparing an electrochemical cell, the method comprising:
forming a silicon-containing negative electrode comprising:
prelithiating a silicon-containing electroactive material with an amount of lithium to form a prelithiated electroactive material comprising a lithium silicide;
wherein the amount of lithium is determined based on the following determined parameters of the electrochemical cell: (i) a positive electrode areal capacity; (ii) a negative electrode capacity to a positive electrode capacity for lithium (N/P) ratio of the electrochemical cell; (iii) a first cycle capacity loss of the electrochemical cell; and (iv) a state of charge of the silicon-containing negative electrode.

9. The method of claim 8, wherein:
(i) the positive electrode capacity is greater than or equal to about 1 mAh/cm$^2$;
(ii) the N/P ratio is greater than or equal to about 1;
(iii) the first cycle capacity loss is greater than or equal to about 10%; and
(iv) the state of charge of silicon-containing negative is greater than or equal to 10%.

10. The method of claim 9, wherein
(i) the positive electrode capacity is about 1 mAh/cm$^2$ to about 8 mAh/cm$^2$;
(ii) the N/P ratio is about 1 to 3;
(iii) the first cycle capacity loss is about 10% to about 50%; and
(iv) the state of charge of the silicon-containing negative electrode is about 10% to about 70%.

11. The method of claim 8, wherein the amount of lithium is determined according to equation (i):

$$C_{pre-Li} = C_p(R_{n/p} \times E_{fc} + X\% \times R_{n/p} - 1) \qquad (i)$$

wherein:
- $C_{pre-Li}$ is a capacity corresponding to the amount of lithium;
- $C_p$ is the positive electrode areal capacity;
- $R_{n/p}$ is the N/P ratio;
- $E_{fc}$ is the first cycle capacity loss; and
- $X\%$ is the state of charge of the silicon-containing negative electrode.

12. The method of claim 8, further comprising admixing an electrically conductive material with the prelithiated electroactive material, wherein the electrically conductive material is selected from the group consisting of carbon black, graphene, graphene nanoplatelet, graphite, carbon nanotubes, carbon fibers, nitrogen-doped carbon, and combinations thereof.

13. The method of claim 8, further comprising:
   admixing a solvent with a polymeric binder and the prelithiated electroactive material to form a mixture, wherein the solvent is selected from the group consisting of: N-methyl-2-pyrrolidone (NMP), dimethylformamide (DMF), dimethyl sulfoxide, propylene carbonate, acetonitrile, tetrahydrofuran, and combinations thereof; and
   applying the mixture to a current collector and volatilizing solvent to form the silicon-containing negative electrode.

14. The method of claim 8, further comprising forming a positive electrode comprising a second electroactive material, wherein the second electroactive material is selected from the group consisting of: $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), sulfur, selenium, and a combination thereof.

15. The method of claim 8, wherein the electrochemical cell is capable of operating at an operating voltage of about 2 volts to about 4.5 volts: (i) during at least a first cycle; (ii) when discharge capacity of the electrochemical cell is less than or equal to 90%; or a combination of (i) and (ii).

16. A method of preparing an electrochemical cell capable of operating in a designated operating voltage, the method comprising:
   (a) determining an amount of lithium to prelithiate a silicon-containing electroactive material for forming a silicon-containing negative electrode and determining a negative electrode capacity to a positive electrode capacity for lithium (N/P) ratio of the electrochemical cell,
      wherein determining the amount of lithium and determining the N/P ratio are based on the following parameters: (i) a determined minimum fractional lithium occupancy, (ii) a determined maximum fractional lithium occupancy, (iii) a determined first cycle efficiency of the silicon-containing negative electrode, and (iv) a determined first cycle efficiency of the positive electrode; and
   (b) prelithiating the silicon-containing electroactive material with the amount of lithium determined in step (a) to form a prelithiated electroactive material comprising a lithium silicide.

17. The method of claim 16, wherein:
the N/P ratio is determined according to equation (vii):

$$NP = \frac{1}{z_{max} - z_{min}}; \qquad (vii)$$

and
the pre-lithiation loading is determined according to equation (viii):

$$\phi = z_{max} - \frac{Z}{NP} \qquad (viii)$$

wherein:
- $\Phi$ is the pre-lithiation loading, defined as the percentage of the amount of lithium for prelithiation to the reversible capacity of the negative electrode;
- NP is the N/P ratio;
- $z_{max}$ is the maximum fractional lithium occupancy for the designated operating window of the negative electrode;
- $z_{min}$ is the minimum fractional lithium occupancy for the designated operating window of the negative electrode; and
- $Z=1/\eta_p - NP(1/\eta_n - 1)$, wherein $\eta_n$ is the first cycle efficiency of the silicon-containing negative electrode and $\eta_p$ is the first cycle efficiency of the positive electrode.

18. The method of claim 16, further comprising admixing an electrically conductive material with the prelithiated electroactive material, wherein the electrically conductive material is selected from the group consisting of carbon black, graphene, graphene nanoplatelet, graphite, carbon nanotubes, carbon fibers, nitrogen-doped carbon, and combinations thereof.

19. The method of claim 16, further comprising:
   admixing a solvent with a polymeric binder and the prelithiated electroactive material to form a mixture, wherein the solvent is selected from the group consisting of: N-methyl-2-pyrrolidone (NMP), dimethylformamide (DMF), dimethyl sulfoxide, propylene carbonate, acetonitrile, tetrahydrofuran, and combinations thereof; and
   applying the mixture to a current collector and volatilizing the solvent to form the silicon-containing negative electrode.

20. The method of claim 16, further comprising forming a positive electrode comprising a second electroactive material, wherein the second electroactive material is selected from the group consisting of: $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), sulfur, selenium, and a combination thereof.

* * * * *